US012052516B2

(12) United States Patent
Feng et al.

(10) Patent No.: US 12,052,516 B2
(45) Date of Patent: Jul. 30, 2024

(54) FLEXIBLE REGION OF INTEREST COLOR PROCESSING FOR CAMERAS

(71) Applicant: QUALCOMM Incorporated, San Diego, CA (US)

(72) Inventors: Wen-Chun Feng, New Taipei (TW); Wei-Chih Liu, Taipei (TW); Yi-Chun Hsu, Taipei (TW); Tai-Hsiang Jen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/648,277

(22) Filed: Jan. 18, 2022

(65) Prior Publication Data

US 2023/0017498 A1 Jan. 19, 2023

Related U.S. Application Data

(60) Provisional application No. 63/219,072, filed on Jul. 7, 2021.

(51) Int. Cl.
| | |
|---|---|
| *H04N 23/88* | (2023.01) |
| *G06V 10/25* | (2022.01) |
| *G06V 40/16* | (2022.01) |
| *H04N 23/80* | (2023.01) |
| *H04M 1/02* | (2006.01) |
| *H04N 23/611* | (2023.01) |

(52) U.S. Cl.
CPC ............. *H04N 23/88* (2023.01); *G06V 10/25* (2022.01); *G06V 40/162* (2022.01); *H04N 23/80* (2023.01); *H04M 1/0202* (2013.01); *H04N 23/611* (2023.01)

(58) Field of Classification Search
CPC .... H04N 23/88; H04N 1/6077; H04N 1/6086; H04N 9/73; H04N 9/735
USPC ........................................................ 348/223.1
See application file for complete search history.

(56) References Cited

U.S. PATENT DOCUMENTS

| | | | | |
|---|---|---|---|---|
| 8,106,961 | B2* | 1/2012 | Nakamura | H04N 23/88 |
| | | | | 348/222.1 |
| 11,064,174 | B2* | 7/2021 | Yuan | H04N 9/643 |
| 2006/0087702 | A1* | 4/2006 | Satoh | H04N 23/843 |
| | | | | 358/461 |
| 2007/0085911 | A1* | 4/2007 | Nakamura | H04N 23/88 |
| | | | | 348/223.1 |

(Continued)

FOREIGN PATENT DOCUMENTS

| | | |
|---|---|---|
| CN | 107730446 A | 2/2018 |
| CN | 106851238 B | 7/2018 |

OTHER PUBLICATIONS

International Search Report and Written Opinion—PCT/US2022/035961—ISA/EPO—dated Oct. 24, 2022.

*Primary Examiner* — Anthony J Daniels
(74) *Attorney, Agent, or Firm* — QUALCOMM Incorporated

(57) ABSTRACT

A method of camera processing including receiving a first image, determining one or more first automatic white balance (AWB) parameters for the first image, determining one or more second AWB parameters for a region-of-interest (ROI) of the first image, applying the one or more first AWB parameters to one or more of the first image or a second image, and adjusting the ROI of one or more of the first image or the second image based on the one or more second AWB parameters.

38 Claims, 12 Drawing Sheets

(56) References Cited

U.S. PATENT DOCUMENTS

| | | | |
|---|---|---|---|
| 2008/0211925 A1 | 9/2008 | Misawa et al. | |
| 2009/0002526 A1* | 1/2009 | Koishi | H04N 25/611 |
| | | | 348/241 |
| 2009/0021602 A1* | 1/2009 | Fujiwara | H04N 23/611 |
| | | | 348/E9.051 |
| 2013/0128073 A1* | 5/2013 | Seok | H04N 23/88 |
| | | | 348/223.1 |
| 2014/0071310 A1* | 3/2014 | Kai | G06V 40/193 |
| | | | 348/223.1 |
| 2015/0326842 A1* | 11/2015 | Huai | G06T 5/002 |
| | | | 348/223.1 |
| 2017/0163953 A1 | 6/2017 | Wang et al. | |
| 2020/0396434 A1* | 12/2020 | Romanenko | H04N 25/134 |

* cited by examiner

FLEXIBLE REGION OF INTEREST COLOR PROCESSING FOR CAMERAS

This application claims the benefit of U.S. Provisional Application No. 63/219,072, filed Jul. 7, 2021, the entire content of which is incorporated by reference herein.

TECHNICAL FIELD

This disclosure generally relates to image and camera processing, and more particularly, to techniques for automatic white balance.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile telephones, cellular or satellite radio telephones, camera-equipped tablets or personal digital assistants (PDAs), computer devices that include cameras such as so-called "web-cams," or any devices with digital imaging or video capabilities.

Image capture devices may be capable of producing imagery under a variety of lighting conditions (e.g., illuminants). For example, image capture devices may operate in environments that include large amounts of reflected or saturated light, as well as in environments that include high levels of contrast. Some example image capture devices include an adjustment module for automatic exposure control, automatic white balance, and automatic focus, in addition to other modules (e.g., a tint adjustment module), to adjust the processing performed by the imaging signal processor hardware.

In image capture devices, adjustment of the image signal processor ("ISP") is often beneficial to achieve proper white balance. White balance (sometimes called color balance, gray balance or neutral balance) refers to the adjustment of relative amounts of primary colors (e.g., red, green and blue) in an image or display such that neutral colors are reproduced correctly. White balance may change the overall mixture of colors in an image. Without white balance, the display of captured images may contain undesirable tints.

SUMMARY

In general, this disclosure describes techniques for performing an automatic white balance (AWB) process. In particular, the techniques of this disclosure describes devices and techniques for determining AWB parameters both globally and for a region-of-interest (ROI) in a scene. In one example, the ROI of the scene may be one or more objects in a scene for which accurate color representation is desired. In some examples, the ROI may be a person's face.

In some examples, a particular ROI of a scene (e.g., the skin tone of a face, an art object, or other ROI) captured by an image may be affected by the illuminants in a scene. In some examples, a scene may include multiple illuminants, and the illuminant lighting an ROI may be different than the environmental illuminant of the scene. As one example, a person's face may be lit by one illuminant (e.g., the display light of a mobile device) that may be substantially different than the environmental illuminant of the scene (e.g., the lighting in the room).

If the illuminant on the ROI has a substantially different color temperature from the environmental illuminant, a camera may determine global AWB parameters that may lead to a color tone shift (e.g., a color cast) on the final image that is captured. The color cast is caused by a white balance difference between the illuminant on the face and the environmental illuminant. In some examples, a camera applies AWB parameters globally based on the environmental illuminant, rather than considering a specific ROI (e.g., a face, art object, etc.).

In examples of this disclosure, a camera processor may be configured to determine AWB parameters globally (e.g., determine an illuminant for an entire image), as well as determine AWB parameters for a specific ROI of the image. In some examples of the disclosure, the ROI is one or more faces. However, the techniques of this disclosure may be used for any type of ROI. The camera processor may then apply the globally determined AWB parameters to the image, and then adjust pixels in the ROI based on the AWB parameters determined for the ROI.

When the ROI is a face, the techniques of this disclosure allow for flexible local face color improvement based on the AWB parameters determined for the face. By applying flexible local face color improvement, the camera processor may determine a specific illuminant for the face, which may result in less color cast in mixed light scenes. Both the face skin tone and background white balance may be fine-tuned individually and flexibly.

In one example, this disclosure describes an apparatus configured for image processing, the apparatus comprising a memory configured to store a first image captured by an image sensor of a camera module, and one or more processors in communication with the memory, the one or more processors configured to receive the first image, determine one or more first automatic white balance (AWB) parameters for the first image, determine one or more second AWB parameters for a region-of-interest (ROI) of the first image, apply the one or more first AWB parameters to one or more of the first image or a second image, and adjust the ROI in one or more of the first image or the second image based on the one or more second AWB parameters.

In another example, this disclosure describes a method for image processing, the method comprising receiving a first image, determining one or more first AWB parameters for the first image, determining one or more second AWB parameters for an ROI of the first image, applying the one or more first AWB parameters to one or more of the first image or a second image, and adjusting the ROI in one or more of the first image or the second image based on the one or more second AWB parameters.

In another example, this disclosure describes an apparatus configured for camera processing, the apparatus comprising means for receiving a first image, means for determining one or more first AWB parameters for the first image, means for determining one or more second AWB parameters for an ROI of the first image, means for applying the one or more first AWB parameters to one or more of the first image or a second image, and means for adjusting the ROI in one or more of the first image or the second image based on the one or more second AWB parameters.

In another example, this disclosure describes a non-transitory computer-readable storage medium storing instructions that, when executed, causes one or more processors to receive a first image, determine one or more first AWB parameters for the first image, determine one or more second AWB parameters for an ROI of the first image, apply the one or more first AWB parameters to one or more of the first image or a second image, and adjust the ROI in one or more of the first image or the second image based on the one or more second AWB parameters.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
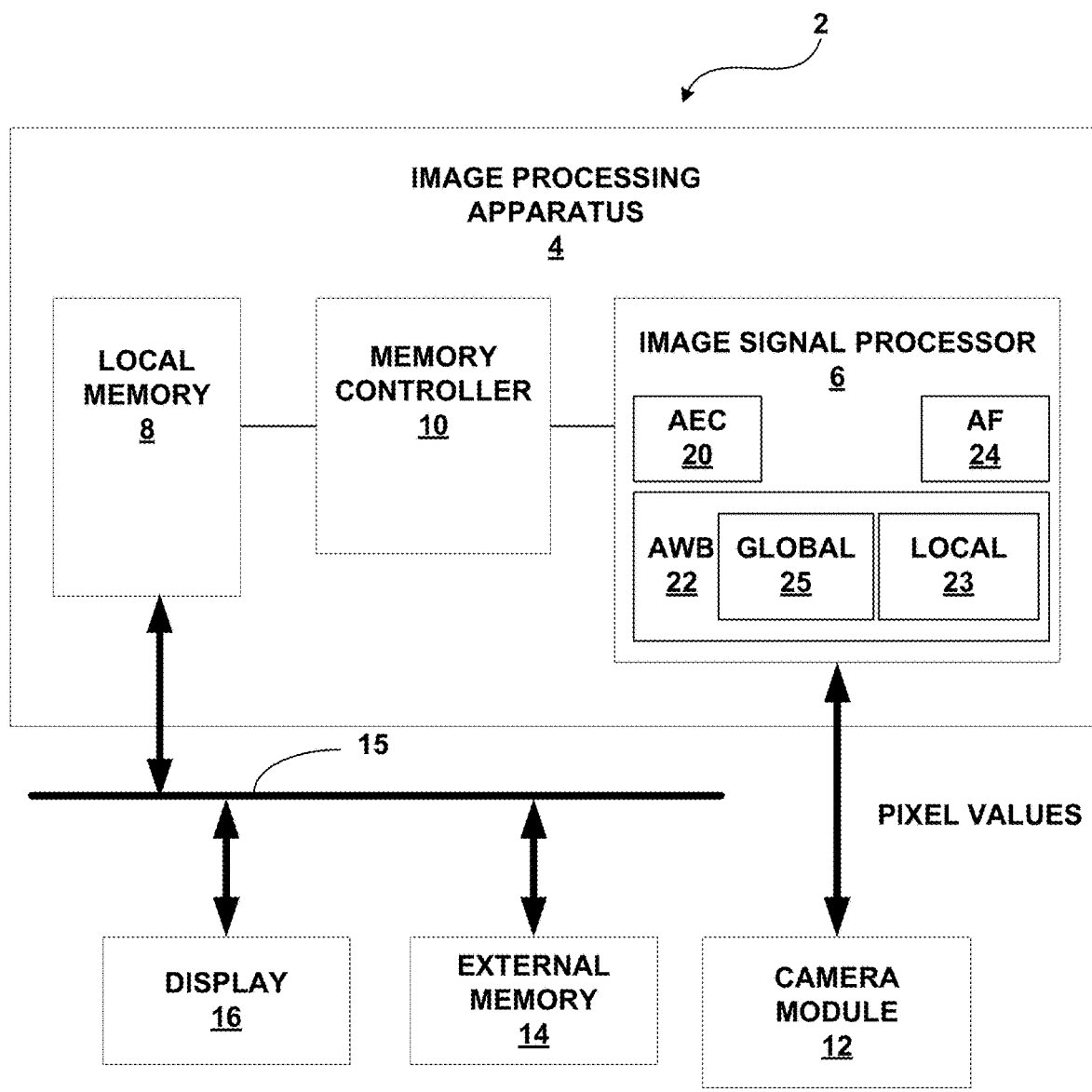
FIG. 1 is block diagram of an exemplary device that may implement techniques for determining illuminants to support an automatic white balance process in accordance with this disclosure.

This disclosure describes image processing techniques that facilitate the determination of a lighting condition (sometimes referred to as the illuminant condition, current illuminant, or color temperature) associated with an image obtained by an image sensor, such as a camera (e.g., a digital camera). The perceived colors of objects are dependent on the type of light (e.g. the lighting condition or illuminant) that is illuminating the object (e.g., indoor incandescent light, indoor fluorescent light, daylight at noon, daylight in late afternoon, etc.). Color perceived by the human eye is basically the combination of the illuminant and the surface of an object, which has a specific color. Thus, the color stimulus perceived by the human eye is different depending on the illuminant. The human visual system can automatically "adjust" or "remove" the impact of the illuminant so that the color perception is closer to the color of the object. This consistent color perception helps humans to recognize colors.

In digital cameras, a white balance process may be applied to a captured image to adjust or remove the impact of the illuminance. The white balance process may involve application of white balance gains and/or scaling to respective colorimetric channels of the image (e.g., RGB, XYZ, or YUV color channels). The gains may be defined for the illuminant for the white balance process. White balance is a process used to correct for image sensor responses in order to better match an image with a user's perceptual experience of the object being imaged. As an example, the white balance process is designed to make gray objects actually appear gray in the processed image.

If an incorrect or suboptimal illuminant is identified, white balance can impair image quality in some cases. If a correct or more optimal illuminant is identified, however, white balance usually improves image quality. As mentioned above, gains and/or scaling can then be applied to various color channels so that the white area actually appears white. This often improves the color fidelity of saturated color areas of an image as well, by adjusting those colors using the gains from the white balance process. The gains or scaling applied to achieve white balance may be predetermined for different illuminants. Accordingly, it is beneficial to determine the approximate illuminant applicable to an image so that an appropriate set of white balance gains can be selected.

In some examples, a user of an image capture device may select or indicate an illuminant under which an image was or will be captured. In other examples, the image capture device itself may automatically determine the most likely illuminant and perform white balancing based on the determined light condition. Such a process is sometimes referred to as automatic white balance (AWB). In order to better reflect the colors of a scene, an AWB algorithm performed by a processor on a camera may attempt to determine the illuminants of the scene and set the white balance accordingly.

However, AWB algorithms have difficulty setting the white balance in some situations. In some examples, a particular ROI of a scene (e.g., the skin tone of a face, an art object, or other ROI) captured by an image may be affected by the illuminants in a scene. In some examples, a scene may include multiple illuminants, and the illuminant lighting an ROI may be different than the environmental illuminant of the scene. As one example, a person's face may be lit by one illuminant (e.g., the display light of a mobile device) that may be substantially different than the environmental illuminant of the scene (e.g., the lighting in the room).

If the illuminant on the ROI has a substantially different color temperature from the environmental illuminant (e.g., a 500 k (kelvin) to 2000 k difference), a camera may determine global AWB parameters that may lead to a color tone shift (e.g., a color cast) on the final image that is captured. The color cast is caused by a white balance difference between the illuminant on the face and the environmental illuminant. In some examples, a camera applies AWB parameters globally based on the environmental illuminant, rather than considering a specific ROI (e.g., a face, art object, etc.).

In examples of this disclosure, a camera processor may be configured to determine AWB parameters both globally (e.g., determine an illuminant for an entire image), as well as determine AWB parameters for a specific ROI of the image. In some examples of the disclosure, the ROI is one or more faces. However, the techniques of this disclosure may be used for any type of ROI. The camera processor may then apply the globally determined AWB parameters to the image, and then adjust pixels in the ROI based on the AWB parameters determined for the ROI.

When the ROI is a face, the techniques of this disclosure allow for flexible local face color improvement based on the AWB parameters determined for the face. By applying flexible local face color improvement, the camera processor may determine a specific illuminant for the face, which may result in less color cast in in mixed light scenes. Both the face skin tone and background white balance may be fine-tuned individually and flexibly.

In one example, this disclosure describes an apparatus configured for image processing, the apparatus comprising a memory configured to store a first image captured by an image sensor of a camera module, and one or more processors in communication with the memory, the one or more processors configured to receive the first image, determine one or more first automatic white balance (AWB) parameters for the first image, determine one or more local AWB parameters for a region-of-interest (ROI) of the first image, apply the one or more first AWB parameters to one or more of the first image or a second image, and adjust the ROI in one or more of the first image or the second image based on the one or more local AWB parameters.

FIG. 1 is a block diagram illustrating a device 2 that may be configured to perform the techniques of this disclosure for automatic white balance. Device 2 may form part of an image capture device, or a digital video device capable of coding and transmitting and/or receiving video sequences. By way of example, device 2 may comprise a stand-alone digital camera or video camcorder, a wireless communication device such as a cellular or satellite radio telephone, a personal digital assistant (PDA), a tablet computer, a laptop computer, a so-called "smartphone," or any device with imaging or video capabilities in which image processing is desirable.

As shown in FIG. 1, device 2 includes an image processing apparatus 4 to store raw image data and perform various processing techniques on such data. Apparatus 4 may comprise a so called "chip set" that includes a digital signal processor (DSP) on-chip memory, and possibly hardware logic or circuitry. More generally, apparatus 4 may comprise any combination of processors, hardware, software or firmware, and the various components of apparatus 4 may be implemented as such. Also, apparatus 4 may comprise a single integrated chip or an encoder/decoder (CODEC), if desired.

In the illustrated example of FIG. 1, image processing apparatus 4 includes a local memory 8, a memory controller 10 and an image signal processor 6. Image signal processor 6 may be a general-purpose processing unit or may be a processor specially designed for imaging applications for a handheld electronic device. As shown, image signal processor 6 is connected to, and in data communication with, local memory 8 and external memory 14 via memory controller 10. In some examples, local memory 8 may be incorporated in image signal processor 6, for example, as cache memory.

As shown in FIG. 1, image signal processor 6 may be configured to execute an AEC (auto exposure control) process 20, an AWB process 22, and an auto focus (AF) process 24. In some examples, image signal processor 6 may include hardware-specific circuits (e.g., an application-specific integrated circuit (ASIC)) configured to perform the AEC, AWB, and/or AF processes. In other examples, image signal processor 6 may be configured to execute software and/or firmware to perform the AEC, AWB, and/or AF processes. When configured in software, code for AEC process 20, AWB process 22, and/or AF process 24 may be stored in local memory 8 and/or external memory 14. In other examples, image signal processor 6 performs the AEC, AWB, and/or AF processes using a combination of hardware, firmware, and/or software. When configured as software, AEC process 20, AWB process 22, and/or AF process 24 may include instructions that configure image signal processor 6 to perform various image processing and device management tasks, including the AWB techniques of this disclosure.

AEC process 20 may include instructions for configuring, calculating, and/or storing an exposure setting of a camera module 12. An exposure setting may include the shutter speed and aperture setting to use to capture images. In accordance with techniques of this disclosure, image signal processor 6 may use depth information captured by camera module 12 to better identify the subject of an image and make exposure settings based on the identified subject. AF process 24 may include instructions for configuring, calculating and/or storing an auto focus setting of camera module 12.

AWB process 22 may include instructions for configuring, calculating and/or storing an AWB setting (e.g., an AWB gain) that may be applied to one or more images captured by camera module 12. In some examples, the AWB gain determined by AWB process 22 may be applied to the image from which the AWB gain was determined. In other examples, the AWB gain determined by AWB process 22 may be applied to one or more images that are captured after the image from which the AWB gain was determined. Hence, AWB gain may be applied to a second image captured subsequently to the first image from which the AWB gain is determined. In one example, the second image may be the image captured immediately after the first image from which the AWB gain was determined. That is, if the first image is frame N, the second image to which the AWB gain is applied is frame N+1. In other examples, the second image may be the image captured two images after the first image from which the AWB gain was determined. That is, if the first image is frame N, the second image to which the AWB gain is applied is frame N+2. In other examples, the AWB gain may be applied to images captured further in time from the first image (e.g., frame N+3, frame N+4, etc.). In other examples, the AWB gain may be applied to a first image from which the AWB gain is determined (e.g., in an offline mode).

Image signal processor 6 may be configured to perform the techniques of this disclosure for flexible region-of-interest (ROI) color improvement. In the context of this disclosure, an ROI may be any sub-region of an image that is user selectable and/or automatically detectable. Example ROIs may include people, faces, pets, objects (such as artwork), automobiles, or any other area of an image. As will discussed in more detail below, AWB process 22 may include global AWB unit 25 and local AWB unit 23. As will be explained in more detail below, image signal processor 6 may receive a first image captured by camera module 12. Global AWB unit 25 of image signal processor 6 may determine one or more global automatic white balance (AWB) parameters for the first image. Local AWB unit 23 may determine one or more local AWB parameters for an ROI of the first image. Image signal processor 6 may apply the one or more global AWB parameters to one or more of the first image or a second image (e.g., a subsequently captured image), and image signal processor 6 may adjust the ROI in one or more of the first image or the second image based on the one or more local AWB parameters. In other examples, image signal processor 6 may also, or alternatively, be configured to apply the AWB parameters to the first image.

Local memory 8 stores raw image data and may also store processed image data following any processing that is performed by image signal processor 6. Local memory 8 may be formed by any of a variety of non-transitory memory devices, such as dynamic random-access memory (DRAM), including synchronous DRAM (SDRAM), magnetoresistive RAM (MRAM), resistive RAM (RRAM), or other types of memory devices. Memory controller 10 controls the memory organization within local memory 8. Memory controller 10 also controls memory loads from local memory 8 to image signal processor 6 and write backs from image signal processor 6 to local memory 8. The images processed by image signal processor 6 may be loaded directly into image signal processor 6 from camera module 12 following image capture or may be stored in local memory 8 during the image processing.

As noted, device 2 may include a camera module 12 to capture the images that are processed, although this disclosure is not necessarily limited in this respect. Camera module 12 may comprise arrays of solid state sensor elements such as complementary metal-oxide semiconductor (CMOS) sensor elements, charge coupled device (CCD) sensor elements, or the like. Alternatively, or additionally, camera module 12 may comprise a set of image sensors that include color filter arrays (CFAs) arranged on a surface of the respective sensors. Camera module 12 may be coupled directly to image signal processor 6 to avoid latency in the image processing. Camera module 12 may be configured to capture still images, or full motion video sequences, in which case the image processing may be performed on one or more image frames of the video sequence.

Camera module 12 may send pixel values (e.g., in a Bayer or RGB format), and/or raw statistics messages describing the captured image to image signal processor 6. The information obtained from camera module 12 may be used in AEC process 20 and AWB process 22, as will be described in more detail below. In general, image signal processor 6 may be configured to analyze the raw statistics and depth information to calculate and/or determine imaging parameters, such as sensor gain, R/G/B gain, AWB gain, shutter speed, aperture size, and the like. The calculated and/or determined imaging parameters may be applied to the captured image, applied to one or more subsequently captured images, and/or sent back to camera module 12 to adjust exposure and/or focus setting.

Device 2 may include a display 16 that displays an image following the image processing described in this disclosure. After such image processing, the image may be written to local memory 8 or external memory 14. The processed images may then be sent to display 16 for presentation to the user. Display 16 may display other information, including visual representations of files stored in a memory location (e.g., external memory 14), software applications installed in image signal processor 6, user interfaces, network-accessible content objects, and other information.

In some examples, device 2 may include multiple memories. For example, device 2 may include external memory 14, which typically comprises a relatively large memory space. External memory 14, for example, may comprise DRAM or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise SDRAM. In any case, external memory 14 and local memory 8 are merely exemplary, and may be combined into the same memory part, or may be implemented in a number of other configurations.

Device 2 may also include a transmitter (not shown) to transmit the processed images or coded sequences of images to another device. The techniques of this disclosure may be used in handheld wireless communication devices (such as so-called smartphones) that include digital camera functionality or digital video capabilities. In that case, the device would also include a modulator-demodulator (MODEM) to facilitate wireless modulation of baseband signals onto a carrier waveform in order to facilitate wireless communication of the modulated information.

Local memory 8, display 16 and external memory 14 (and other components if desired) can be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

As noted above, white balance can be an important process for digital camera applications or other applications that present images to users. White balance is typically used to correct an image captured by an image sensor in order to better match the colors of the captured image with a human viewer's perceptual experience of the object being captured. Essentially, white balance is a process of identifying one or more colors in an image that should appear white under the identified lighting. Gains or other scaling can then be applied to various color channels of the image so that the white area actually appears white. White balance typically refers to this process of scaling the color channels to adjust for illuminants. The scaling of color channels associated with a digital image can often improve the color fidelity of saturated color areas of an image as well by adjusting those colors using the gains from the white balance process.

However, white balance is dependent upon the illuminant identified for an image. If the wrong illuminant is identified, white balance can actually impair image quality in some cases. If the correct illuminant is identified, however, white balance usually improves image quality. According to the techniques of this disclosure, techniques are described for improving the determination of actual illuminants associated with an image. In particular, this disclosure describes techniques whereby image signal processor 6 determines AWB parameters for a specific ROI (e.g., a face, person, pet, object, etc.) as well as global AWB parameters for the entire image. Image processor 6 may use the AWB parameters determined for the specific ROI to adjust the AWB in that ROI to account for scenes that may have multiple illuminants. This technique may be useful when the illuminant for the entire scene is substantially different than a illuminant that is lighting the ROI (e.g., a 500 k to 2000 k difference in color temperature).

Figure 2:
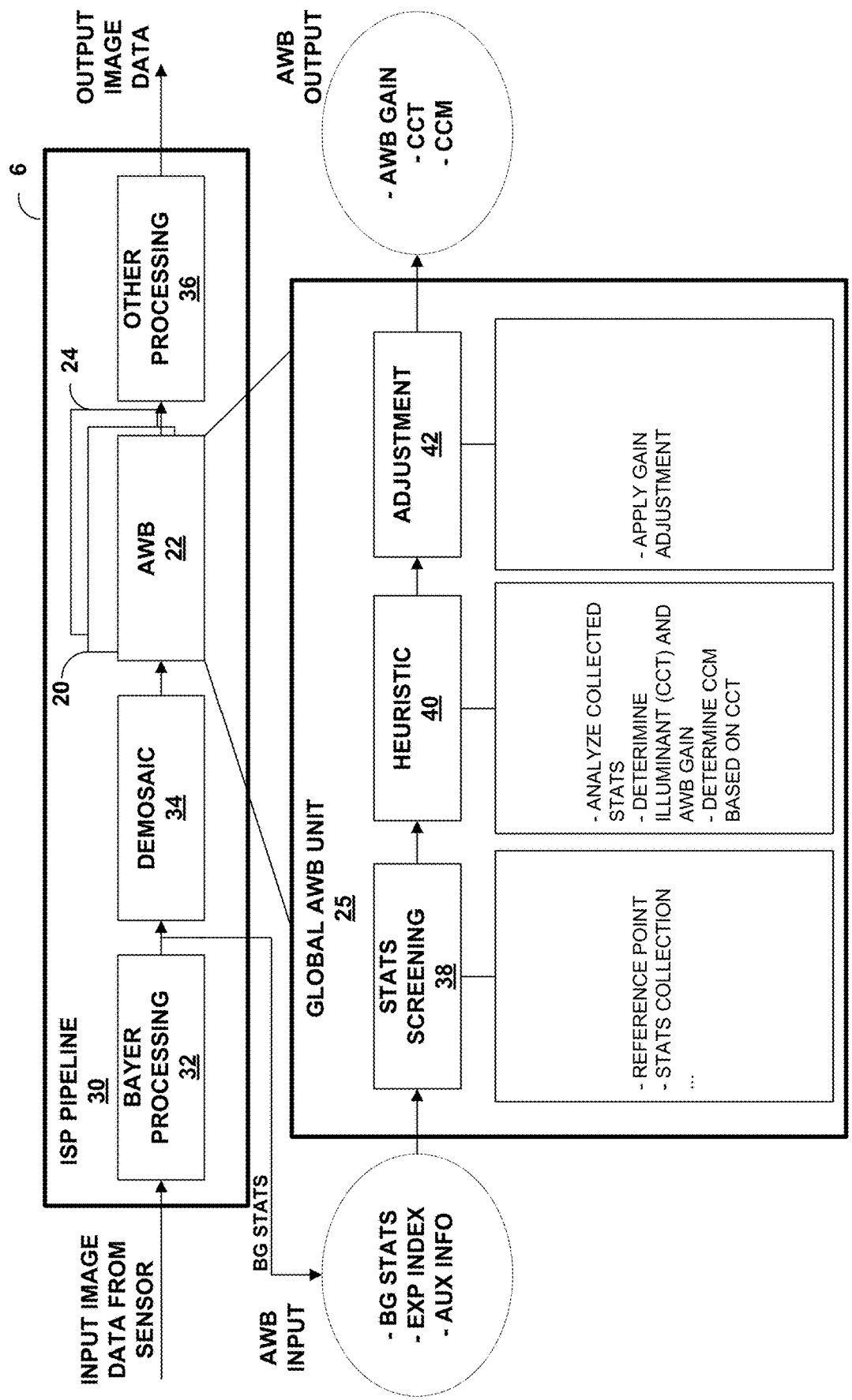
FIG. 2 is a block diagram showing the operation of an image signal processor performing an automatic white balance process.

FIG. 2 is a block diagram showing an example of the operation of image signal processor 6 performing an automatic white balance process in more detail. Image signal processor 6 may be configured to execute an image signal processing (ISP) pipeline 30 to process image data input to image signal processor 6. The example of FIG. 2 is focused on AWB process 22. However, ISP pipeline 30 may also include AEC process 20 and AF process 24, which may be performed in parallel, or serially, with AWB process 22.

In the example of FIG. 2, image signal processor 6 receives input image data from camera module 12. In some examples, e.g., in mobile devices, image signal processor 6 may be configured to continuously receive (e.g., at a predetermined frame rate) images captured by camera module 12 during a so-called "preview mode." During the preview mode, camera module 12 may be configured to capture images and a predetermined framerate. The predetermined framerate may depend on a mode of operation and the amount of light available to camera module 12. Example framerates may include 10 fps (frames per second), 24 fps, 30 fps, or more.

In the preview mode, images captured by camera module 12 may be displayed on display 16 so that a user may view the scene. Images captured during the preview mode may be temporarily stored in a buffer and then may be discarded. A user may select a shutter button to permanently capture and store one or more images. As will be explained in more detail below, in some examples, image signal processor 6 may be configured to determine AWB parameters from images captured during a preview mode and/or images captured in response to a selection of a shutter button. Image signal processor 6 may then be configured to apply the determined AWB parameters to subsequently captured images.

In one example, the subsequently captured image may be the image captured immediately after the first image from which the AWB gain was determined. That is, if the first image is frame N, the subsequently captured image to which the AWB gain is applied is frame N+1. In other examples, the subsequently captured image may be the image captured two images after the first image from which the AWB gain was determined. That is, if the first image is frame N, the subsequently captured image to which the AWB gain is applied is frame N+2. In other examples, the AWB gain may be applied to images captured further in time from the first image (e.g., frame N+3, frame N+4, etc.). The subsequently captured images may be subsequently captured images that are captured during a preview mode and/or subsequently captured images that are captured in response to the selection of a shutter button.

The input image data received includes color data of the image. The color data received for the input image may be in a Bayer format. Rather than capturing red (R), green (G), and blue (B) values for each pixel of an image, image sensors may use a Bayer filter mosaic (or more generally, a color filter array (CFA)), where each photosensor of a digital photo sensor captures a different one of the RGB colors. Typical filter patterns for a Bayer filter mosaic include 50% green filters, 25% red filters, and 25% blue filters.

Bayer processing unit 32 may perform one or more initial processing techniques on the raw Bayer data received by image signal processor 6, including, for example, black level subtraction, rolloff correction, bad pixel correction, and/or denoising. Demosaic processing unit 34 may be configured to convert the processed Bayer image data into RGB values for each pixel of the image. As explained above, Bayer data may only include values for one color channel (R, G, or B) for each pixel of the image. Demosaic processing unit 34 may determine values for the other color channels of a pixel by interpolating from color channel values of nearby pixels.

AWB process 22 analyzes information relating to the captured image to determine an illuminant, from among a plurality of possible illuminants, and determines an AWB gain to apply to subsequently captured images and/or the captured image used to determine the AWB gain. FIG. 2 shows the example of AWB process 22 determining AWB parameters using global AWB unit 25. Global AWB unit 25 determines AWB parameters using the so-called "gray-world assumption" techniques. Techniques relating to determining local AWB parameters (e.g., AWB parameters for an ROI) using local AWB unit 23 will be discussed below with reference to FIG. 3.

As shown in FIG. 2, example inputs to global AWB unit 25 includes Bayer grid (BG) statistics (BG STATS) of the captured image, an exposure index (e.g., the brightness of the captured image) (EXP INDEX), and auxiliary information (AUX INFO), which may include depth information. The BG statistics represent the actual raw color values in the captured image in the Bayer domain. However, it should be understood that it is not necessary to use BG statistics, and instead, RGB values of each pixel after demosaicing may also be used by global AWB unit 25.

Stats screening process 38 identifies pixel values in the image that are close to gray tones (e.g., called near-gray pixels) as defined by various different illuminants. That is, what color values are considered to be gray may be different for each of a plurality of illuminants. Gray values for various illuminants may be predefined and stored as a reference point for each illuminant.

As one example, seven different illuminants may be defined using reference points that are calibrated according to the following TABLE 1.

TABLE 1

| Illuminant | R/G Ratio | B/G Ratio |
|---|---|---|
| D65 (outdoor-midday) | 0.65 | 0.83 |
| Shade (outdoor) | 0.60 | 0.90 |
| Incandescent (indoor) | 1.10 | 0.51 |
| Cool White (indoor) | 0.76 | 0.54 |
| Warm Fluorescent (indoor) | 0.87 | 0.59 |
| Horizon (outdoor) | 1.28 | 0.46 |
| D50 (outdoor) | 0.77 | 0.69 |

Each of the illuminants in Table 1 is a predefined standard that is intended to represent a theoretical source of visible light for a given sensor module used by camera module 12. Colors, including gray values and white values, will look different to the human eye under different light sources. Stats screening process 38 may consider more or fewer illuminants than shown in Table 1. In general, stats screening process 38 may consider both a plurality of indoor illuminants (e.g., as produced by various types of light bulbs) as well as a plurality of different outdoor illuminants (e.g., as produced by the sun at different parts of the day or in different conditions).

As can be seen in Table 1, reference point gray values may be defined based on a ratio of R/G values in a pixel and/or B/G values in a pixel. Based on these parameters, gray point lines can be defined for each respective illuminant in a two-dimensional color space. For comparison purposes, a bounding rectangle on the Cb-Cr (blue and red chroma values) domain can also be obtained to collectively bound all of the gray point lines.

Stats screening process 38 identifies near-gray pixels of an image for a plurality of different illuminants based on the statistics of the image (e.g., R/G and or B/G ratios of a pixel or region of an image). In some examples, stats screening process 38 identifies the near-gray pixels based on gray point lines defined for the different illuminants (e.g., the reference points) and bounding volumes (e.g., cylindrical bound volumes) defined around the gray point lines. For example, gray point lines may be defined in a three-dimensional color space for the different illuminants. These gray point lines define actual gray colors for the respective illuminants, and generally differ within the three-dimensional color space for the different illuminants. In other words, different illuminants define different gray point lines within the same color space. For each of the gray point lines associated with the different illuminants, a cylindrical bounding volume is defined about the respective gray point lines. In one example, a radius of approximately six pixels may be used to define the cylindrical bounding volumes about the respective gray point lines. Global AWB unit 25 may select the illuminant having the greatest number of near-gray pixels associated with the respective bounding volume.

After statistics collection for the various illuminants, heuristic process 40 may determine an initial auto white balance gain for the captured image. Heuristic process 40 may be configured to analyze the collected statistics of the image (e.g., the number of near-gray pixels identified per illuminant). In some examples, heuristic process 40 selects one of the illuminants based on the near-gray pixels identified for the different illuminants based at least in part on a pixel count for that respective illuminant. In other words, heuristic process 40 may use the pixel statistics associated with the most probable respective illuminant to determine the auto white balance gain.

The most probable respective illuminant may be the illuminant for which the most pixels (e.g., R/G pixel statistics) of the image fall within the defined bounding volume for that illuminant. In this sense, the techniques of this disclosure may rely somewhat on the "gray world assumption," insofar as the illuminant for which most pixels of the image falls within the defined bounding volume can used for determining the auto white balance gain. Other factors, however, may also be used along with the pixel counts to determine the auto white balance gain, including the number of green pixels in the image, the number of blue pixels in the image, and/or the intensity of the pixels of the image. The determined auto white balance gain is a scaling factor that may be multiplied to the pixel values of the image in order to make white and gray pixels in the image appear correctly white and gray for a particular illuminant.

The auto white balance gain determined by heuristic process 40 may be used to determine a current illuminant. In this context, the "current" illuminant is the illuminant that most closely matches the lighting conditions for the current image being processed. Each of a plurality of predefined illuminants may have associated predefined auto white balance gains. Heuristic process 40 may compare the auto white balance gain determined using the techniques described above with the predefined auto white balance gains associated with the plurality of illuminants. Heuristic process 40 selects the illuminant with the associated predefined auto white balance gain that most closely matches the determined auto white balance gain as the current illuminant. The current illuminant selected by heuristic process 40 may be defined by a correlated color temperature (CCT). A CCT is a measure of the appearance of the colors of a light source relative to a blackbody.

In addition, based on the CCT of the determined current illuminant, heuristic process 40 may optionally determine a color correction matrix (CCM) to apply to the white balance adjusted image. A CCM may be used in a color balance process to adjust the intensities of colors. Often, given a particular CCT, it is preferable to adjust the colors in an image so that warmer or cooler tones are more prevalent.

Once the AWB gain is determined by heuristic process 40, adjustment process 42 may apply, in some examples, an adjustment to the AWB gain, if necessary. Adjustment process 42 then outputs the final AWB gain, along with the CCT and CCM for use on the current image from which the AWB gain was determined and/or on one or more future images captured by camera module 12 subsequent to the capture of the current image. The AWB gain, CCT, and CCM may be referred to as AWB parameters. In the context of this disclosure, applying AWB parameters to an image may include applying one or more of the AWB gain, CCT, or CCM to an image. In one example, applying the AWB parameters may include just applying the AWB gain to the image.

Image signal processor 6 may then apply the output AWB gain to one or more current or subsequent images. For example, image signal processor 6 may apply AWB gains to colorimetric channels (e.g., RGB) of the current image and/or one or more subsequent images. As an example, image signal processor 6 may determine a white reference area in the image, and then adjust that area as well as other areas of the image by applying selected gains (for that illuminant) on the color channels in order to improve the whiteness of the white reference area. The application of these gains to color channels may also improve color fidelity of areas of the image that exhibit highly saturated colors.

After AWB process 22 is completed, other processing unit 36 may apply additional processing to the image. The additional processing may include color, tone, and/or spatial processing of the image. For example, other processing unit 36 may use the CCM generated from the CCT of the determined current illuminant current illuminant to apply a color balance process to the image.

Figure 3:
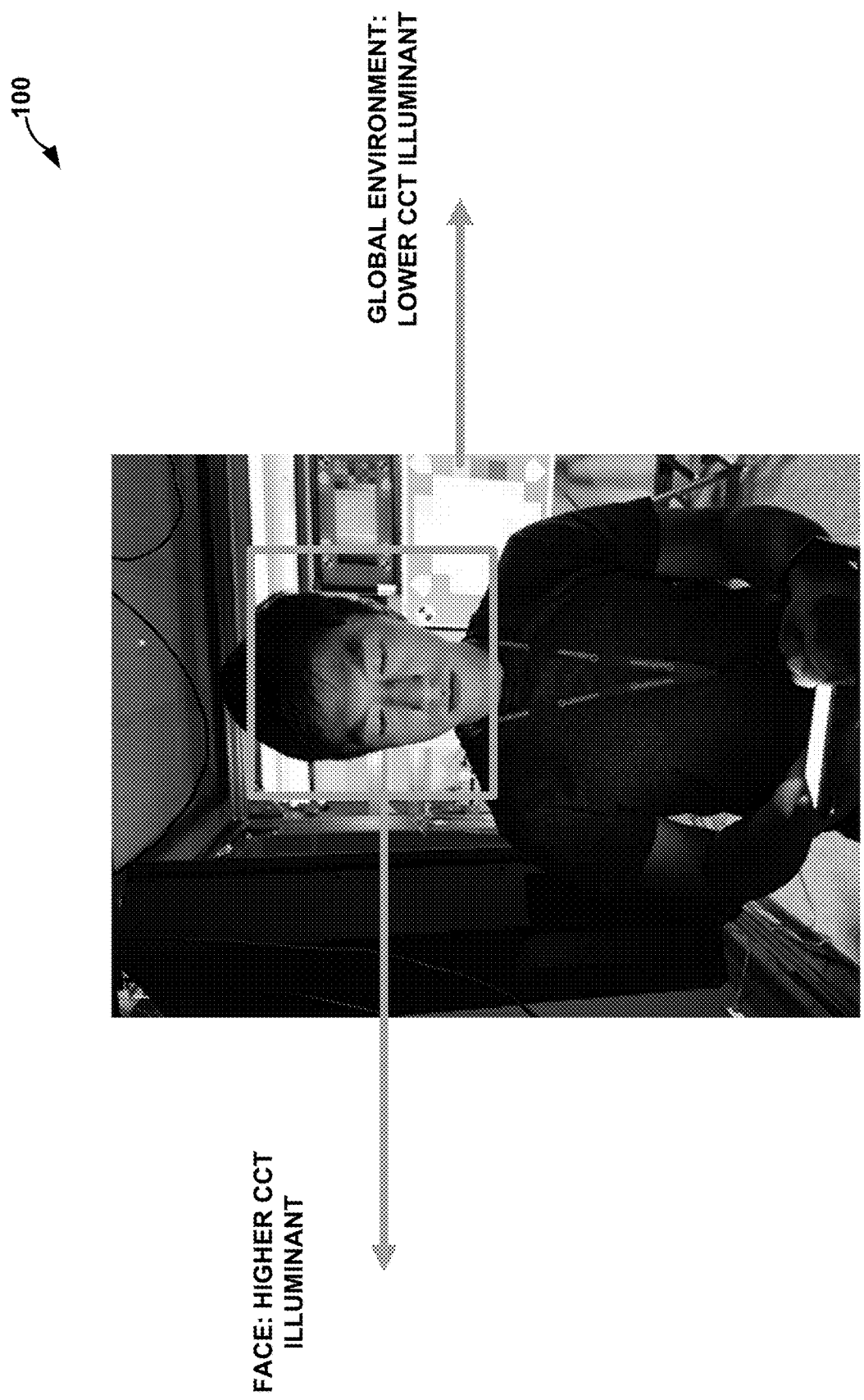
FIG. 3 is an example image illustrating skin tone shift in a mixed light environment.

FIG. 3 is an example image illustrating tone shift of an ROI in a mixed light environment. In particular, FIG. 3 shows an example of a face tone shift for a face ROI in a mixed light environment. As shown in FIG. 3, the face color (e.g., skin tone) of the person depicted in image 100 may be affected by multiple illuminants in the scene. As shown in FIG. 3, the main illuminant in the scene (e.g., the global illuminant) is from the lighting in the room (e.g., a lower CCT illuminant than the illuminant on the face in this example). However, the face of the person in image 100 is lit by the display light of a mobile phone (e.g., a higher CCT illuminant relative to the lighting in the room). In examples, where the multiple illuminants have large differences in CCT (e.g., a difference of 500 k to 2000 k), the color case of the ROI (in this case, the skin tone) may be affected if the AWB gain or other AWB parameters (e.g., determined CCT or CCM) are only based on the determined global illuminant.

Figure 4:
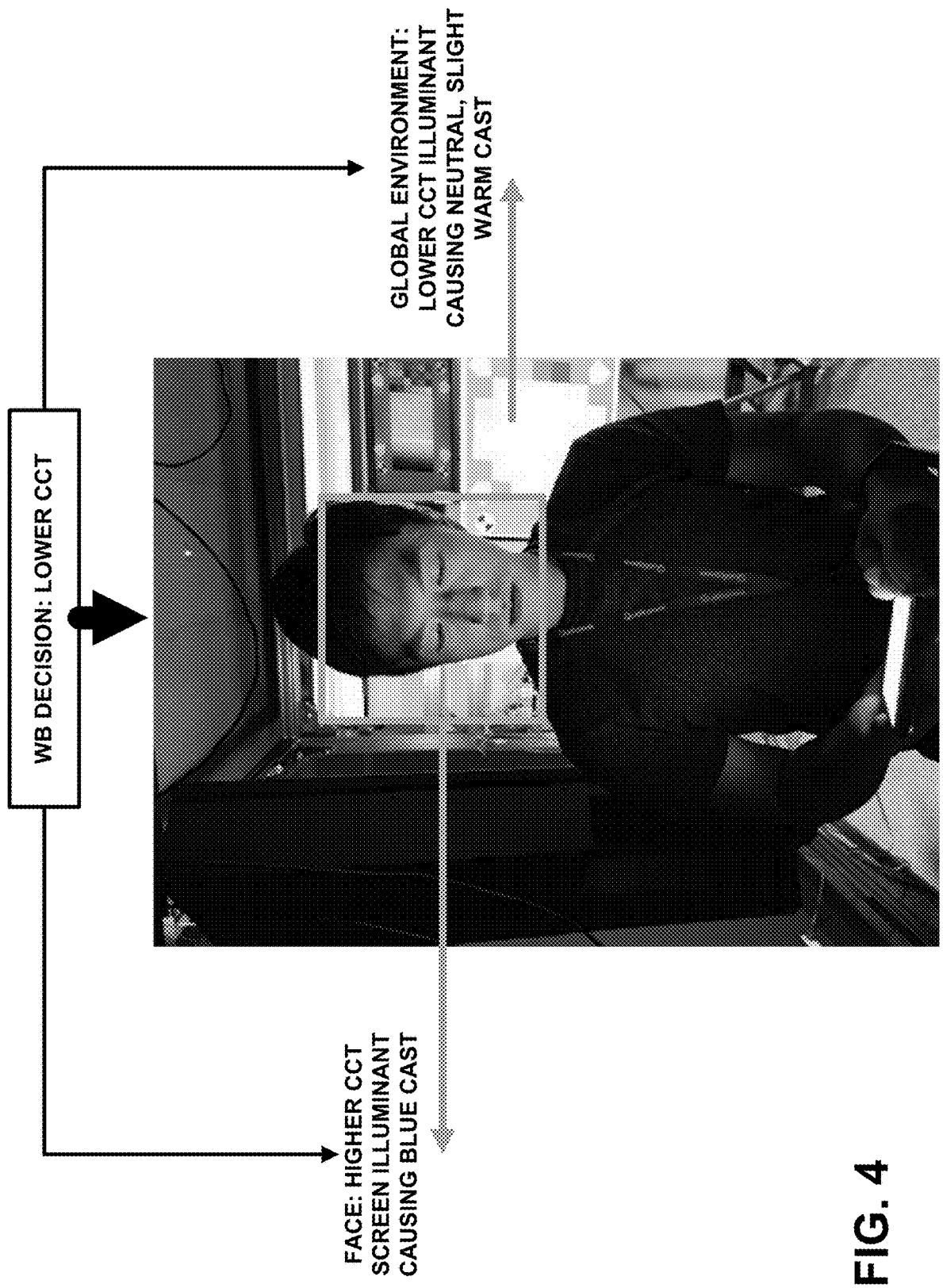
FIG. 4 is a conceptual diagram illustrating an example automatic white balance decision.

FIG. 4 is a conceptual diagram illustrating an example automatic white balance decision. As discussed above, a skin tone shift may be caused by a white balance (WB) difference between the illuminant lighting a person's face (e.g., the relatively higher CCT local illuminant) and the illuminant of the global environment of the image (e.g., the relatively lower CCT global illuminant). If the white balance decision is applied globally rather than considering a specific region-of-interest (e.g., the face), the color cast may appear incorrect in regions of the image lighted by the local illuminant. For example, in FIG. 4, the global illuminant is a relatively lower CCT illuminant (e.g., compared to the local illuminant), resulting in a neutral, slightly warm color cast. However, the local illuminant (e.g., the mobile device screen) is a relatively higher CCT illuminant compared to the global illuminant. Applying only the global illuminant (e.g., the lower CCT illuminant) to the scene will cause the skin tone to have a blue cast.

This disclosure describes techniques that allow for the determination of AWB parameters for scenes with multiple illuminants. In particular, this disclosure describes techniques where AWB parameters for a global illuminant (e.g., the entire scene) are determined in addition to AWB parameters for a specific ROI. This disclosure describes specific techniques where the ROI is a person's face. However, it should be understood that the techniques of this disclosure may be used with any ROI.

Figure 5:
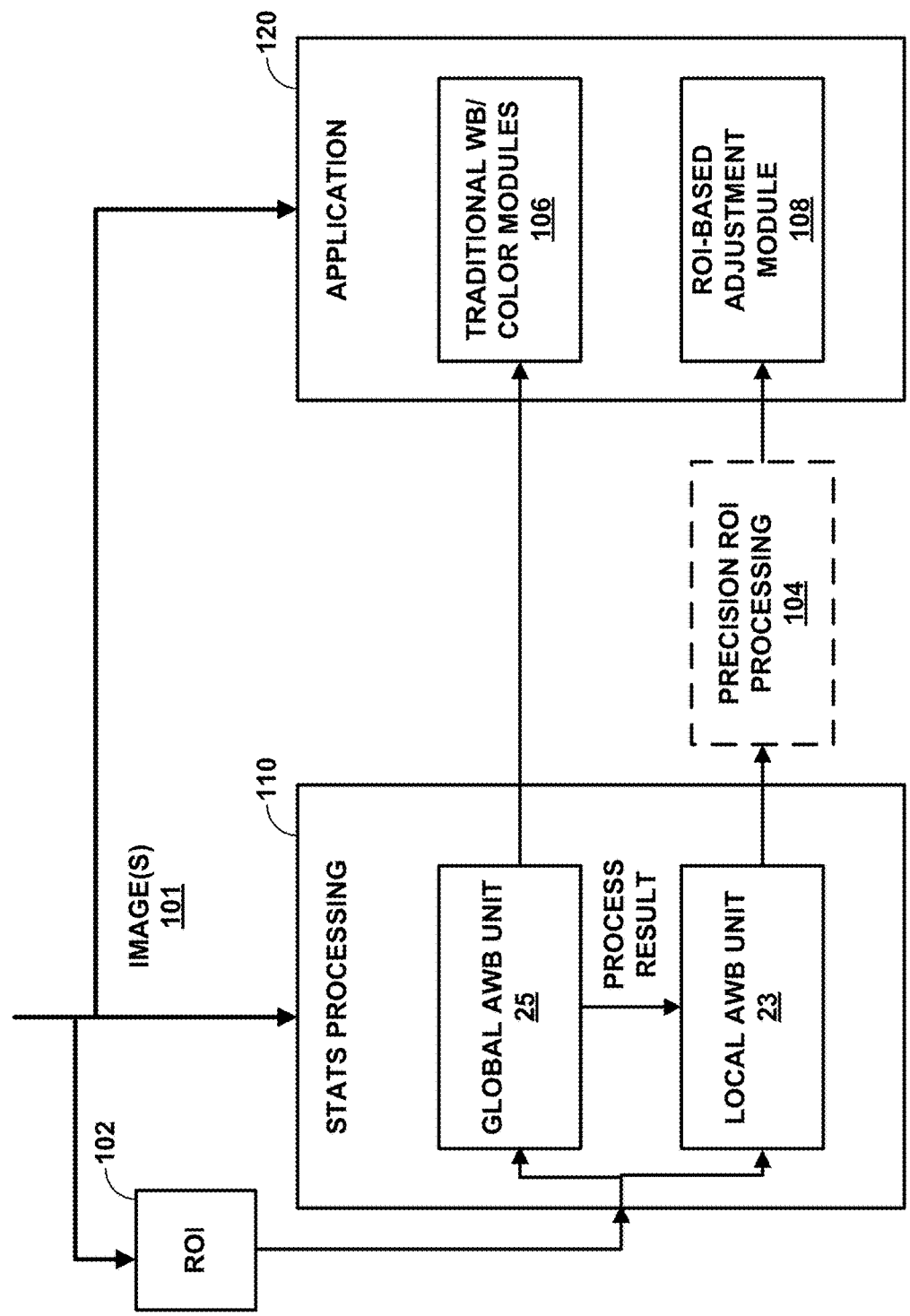
FIG. 5 is a block diagram illustrating a combined global and face automatic white balance process.

FIG. 5 is a block diagram illustrating a combined global and local automatic white balance process. In FIG. 5, local AWB unit 23, in addition to global AWB unit 25, form AWB process 22 (see FIG. 2). In the example of FIG. 5, stats processing module 110 and application module 120 may be any combination of hardware, firmware, and/or software and may be executed by image signal processor 6. As shown in FIG. 5, application module 120 may include traditional WB/color modules 106 and ROI-based adjustment module 108.

Figure 6:
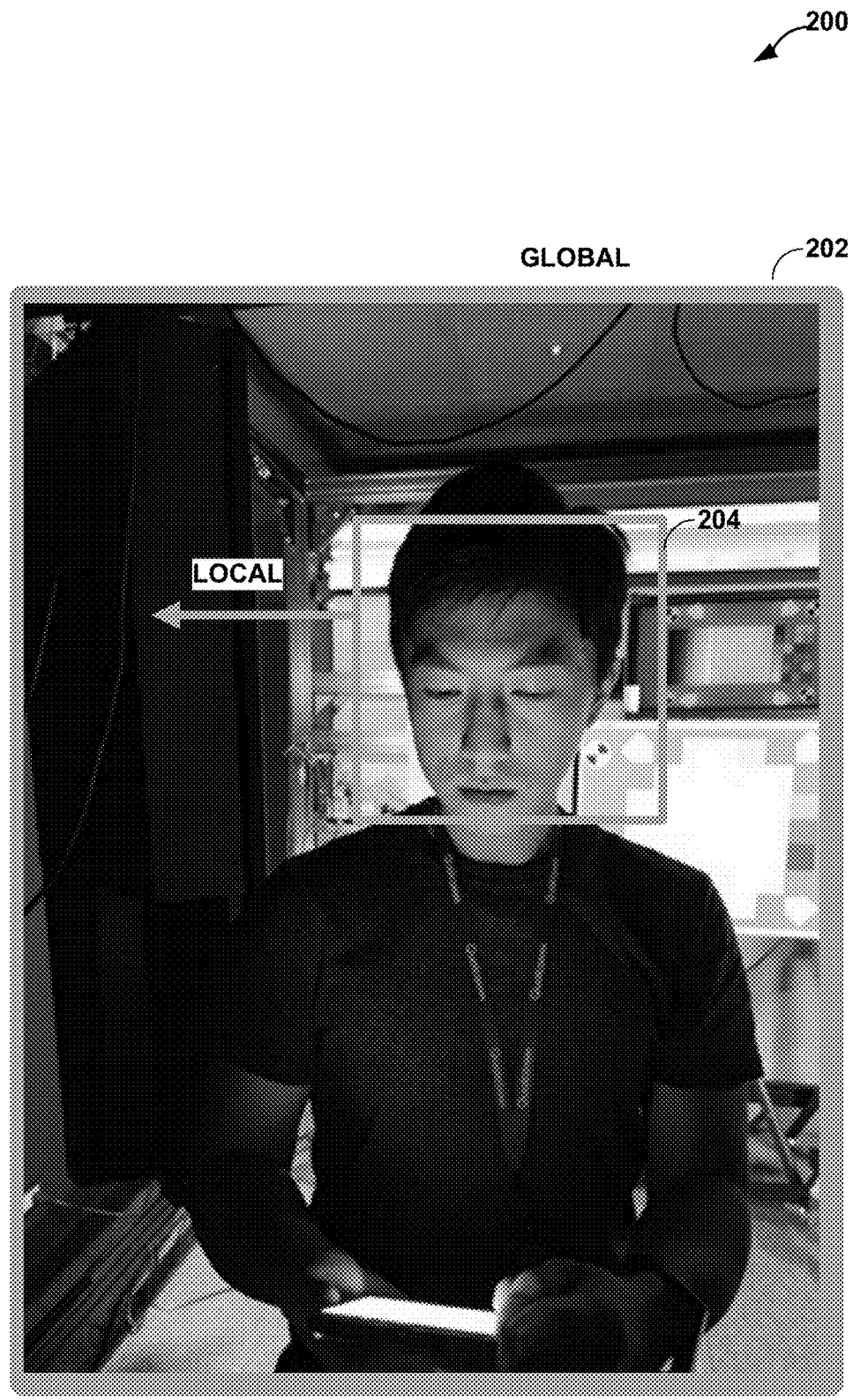
FIG. 6 is an example image illustrating regions of an image used for the combined global and face automatic white balance process of FIG. 5.

In the example of FIG. 5, image signal processor 6 may be configured to perform local ROI (e.g., a face) color improvement techniques that separate the white balance and color processes for a local ROI and the global environment (e.g., the entire image). FIG. 6 shows an example image 200 that illustrates a global region 202 (e.g., the entire image) representing the global environment for processing by global AWB unit 25, and a local region 204 representing an example of an ROI for processing by local AWB unit 23.

Returning to FIG. 5, ROI unit 102 and stats processing unit 110 may be configured to receive one or more images 101. Images 101 may include successive images captured by camera module 12 in a preview mode. ROI unit 102 may be configured to identify a specific ROI in a first image of images 101 that is captured. The ROI may be any sub-region of the image.

In some examples, ROI unit 102 may be configured to automatically detect one or more ROIs in the first image and provides a bounding box for the ROIs. For example, ROI unit 102 may be configured to perform automatic face detection in the first image and provide local AWB unit 23 the location of the face using coordinates of a bounding box around the face. In other examples, ROI unit 102 may indicate a bounding box of an ROI (e.g., face, pet, art piece, other object, etc.) from a user input (e.g., tap input, gesture input, voice input), audio input, saliency detection, image segmentation techniques, including artificial intelligence-based skin detection or skin chroma filtering, or other ROI detection techniques. The bounding box defines the location of the ROI in the first image.

Image processor 6 may determine one or more first AWB parameters for the first image, and one or more second AWB parameters for the ROI of the first image. In some examples, the first AWB parameters may be AWB parameters for the entire image, and the second AWB parameters may be AWB parameters for the ROI. In other examples, the first AWB parameters are AWB parameters for a region of the image that is less than the entirety of the image, but larger that the ROI.

To determine the first and second AWB parameters, image processor 6 may perform stats processing 110 on the image, including the ROI, using both global AWB unit 25 and local AWB unit 23. Global AWB unit 25 may determine a global illuminant and associated AWB parameters (e.g., the first AWB parameters) for the image using any AWB technique, including the AWB techniques described above with reference to FIG. 2. The first AWB parameters and/or second AWB parameters may include one or more of an AWB gain, a correlated color temperature (CCT), or a color correction matrix (CCM).

Local AWB unit 23 may determine a local illuminant and associated AWB parameters (e.g., AWB gain, CCT, and/or CCM) for the ROI provided by ROI unit 102. In some examples, local AWB unit 23 may determine separate AWB parameters for each of multiple ROIs (e.g., multiple faces or other ROIs in an image). In some examples, local AWB unit 23 may determine AWB parameters using the same techniques as global AWB unit 25, but only using pixel data located in a specific ROI. In this way, local illuminants may be more accurately determined from global illuminants. In other examples, local AWB unit 23 may further consider the AWB parameters generated by global AWB unit 25 (e.g., the process results) in determining the local AWB parameters.

In some examples, before application of the determined AWB parameters, image signal processor 6 may perform precision ROI processing 104. In general, precision ROI processing 104 may be configured to determine a specific sub-region of the ROI bounding box that includes features of the ROI to which it is desired to apply the local AWB parameters. In some examples it may be beneficial to only apply the local AWB parameters to certain portions of the ROI identified, as the incorrect color cast may be most noticeable in specific areas (e.g., skin areas for face ROIs).

As one example, if the ROI is a painting, it may be desirable to only apply local AWB parameters to the actual painted area, and not to the frame. As another example, precision ROI processing 104 may determine what portions of a face ROI are skin and what portions are not skin (e.g., hair, hats, glasses, mask, etc.). Precision ROI processing 104 may determine the skin area of the ROI using one or more segmentation methods, such as artificial intelligence (AI)-based skin detection and/or skin chroma filtering.

Figure 7:
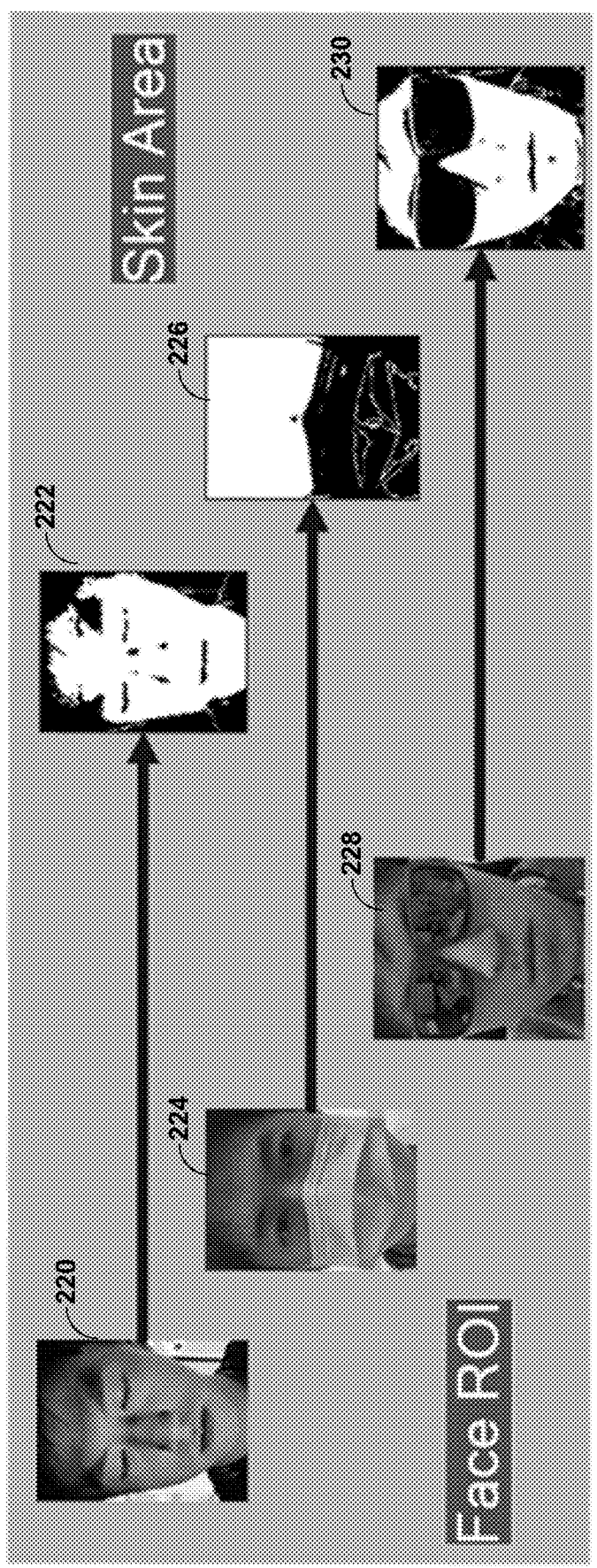
FIG. 7 is a conceptual diagram illustrating skin area detection of a face ROI.
Figure 8:
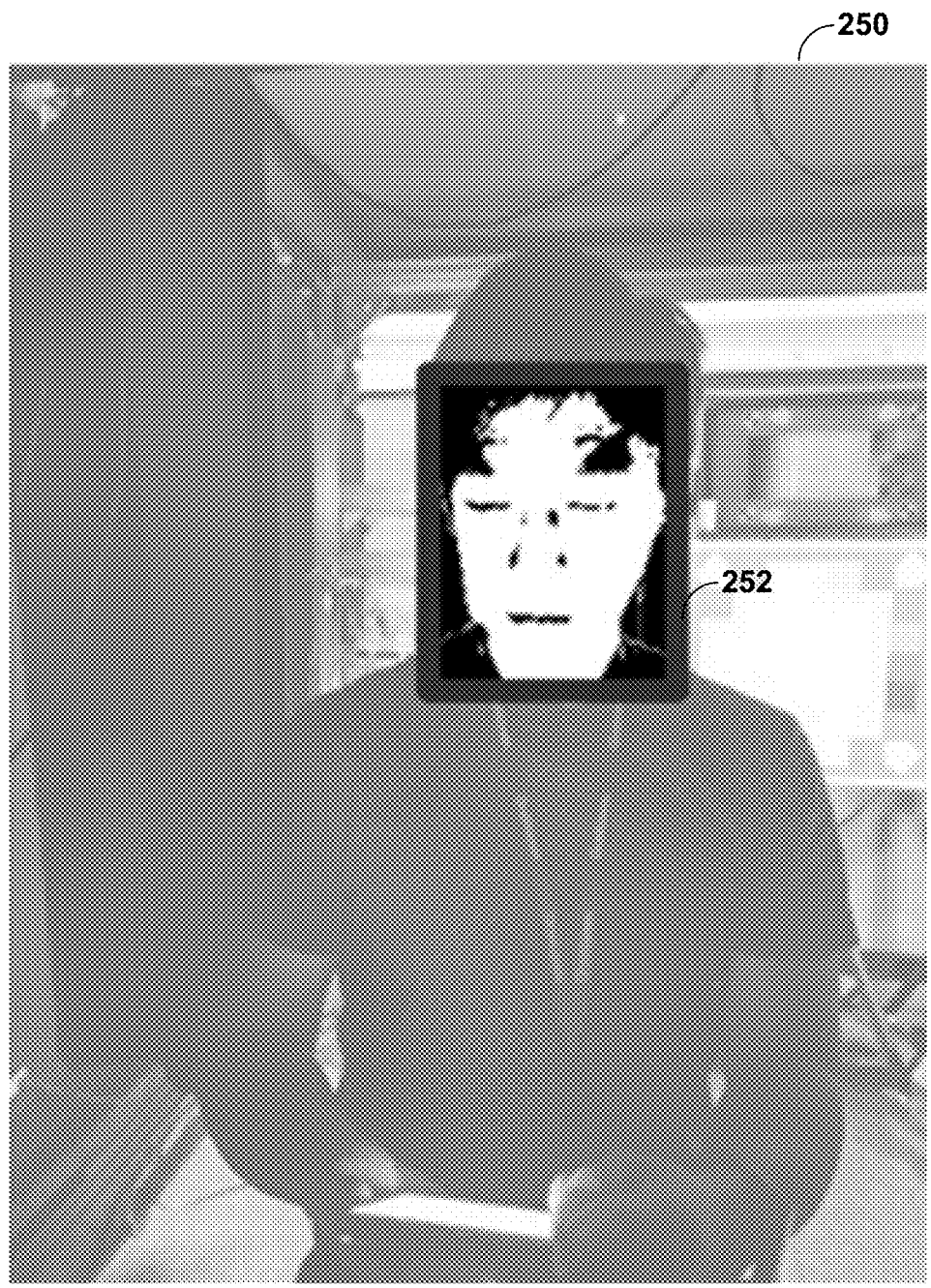
FIG. 8 is a conceptual diagram illustrating an image with a face region of interest.

FIG. 7 is a conceptual diagram illustrating skin area detection of a face ROI. As shown in FIG. 7, ROI 220 includes a face. The skin detected ROI 222 shows the skin area in white, and non-skin areas in black. ROI 224 includes a face wearing a mask. The skin detected ROI 226 shows the skin area in white, and the non-skin areas (e.g., the mask) in black. ROI 228 includes a face wearing sunglasses. The skin detected ROI 230 shows the skin area in white, and the non-skin areas (e.g., the sunglasses) in black. FIG. 8 is a conceptual diagram illustrating an image 250 with a face region of interest. The skin is highlighted white in ROI 252 in FIG. 8.

After determining the first and second AWB parameters (e.g., the global and local AWB parameters, image signal processor 6 may apply the first AWB parameters to at least a portion of the first image, and apply the second AWB parameters to the ROI of the first image. As described above, image signal processor 6 may also be configured to apply the determined first AWB parameters and second AWB parameters to one or more second images (e.g., images captured after the first image).

When using precision ROI processing, ROI-based adjustment module 108 may apply an adjustment to the skin area of the ROI using the local AWB parameters. In some examples, ROI-based adjustment module 108 of application module 120 may apply the adjustment after traditional while balance/color module 106 of application module 120 applies the global AWB parameters to the entire image (e.g., as described above with reference to FIG. 2). That is, ROI-based adjustment module 108 may adjust the white balance of the skin area of the ROI after global AWB parameters have been applied to the entire image. As discussed above, both the global AWB parameters and local AWB parameters may be applied to images that are captured subsequent to the image from which the AWB parameters were determined. In other examples, the global AWB parameters and local AWB parameters may be applied to the same image from which the AWB parameters were determined.

In some examples, precision ROI processing 104 may be skipped. In this example, ROI-based adjustment module 108 may apply the local AWB parameters to all of the pixels in the ROI.

In some examples, ROI-based adjustment module 108 may apply the local AWB parameters using grids and/or mesh-based modules. For example, ROI-based adjustment module 108 may use the local AWB parameters to adjust the skin area of an ROI (or the entire ROI) by adjusting the values in a grid or mesh table (e.g., grid white balance technique and/or lens shading correction). In other examples, ROI-based adjustment module 108 may apply the local AWB parameters using pixel-based modules. For example, ROI-based adjustment module 108 may use the local AWB parameters to adjust the skin area of an ROI (or the entire ROI) by adjusting the pixel values pixel-by-pixel (e.g., using post-processing color algorithms or other pixel processing technique).

Figure 9:
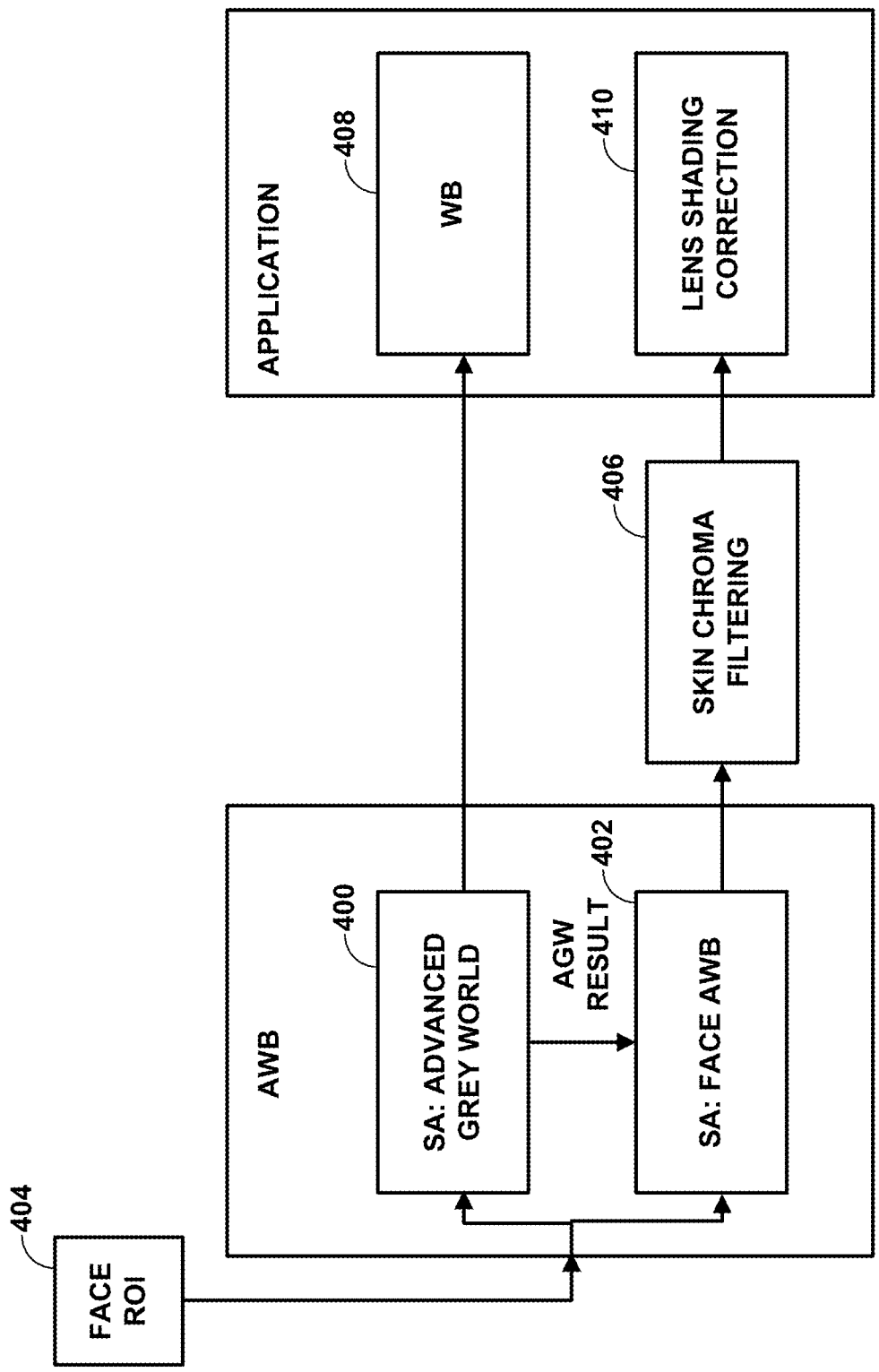
FIG. 9 is a block diagram illustrating another combined global and face automatic white balance process.

FIG. 9 is a block diagram illustrating another combined global and face automatic white balance process. In FIG. 9, the global AWB unit 400 applies a scene analyzer (SA) advanced grey world (AGW) AWB technique (e.g., as described above in FIG. 2) to obtain an AGW result. The local AWB unit 402 is a face AWB unit. The face AWB unit uses the pixel values in the face ROI 404 as well as the AGW result (e.g., the global AWB parameters) to determine the local AWB parameters. The precision ROI processing 406 is implemented as skin chroma filtering. The global AWB parameters are applied using a traditional white balance (WB) process 408 (e.g., as described in FIG. 2) and the local AWB parameters are applied to the segmented skin region of the face ROI using lens shading correction 410.

Figure 10:
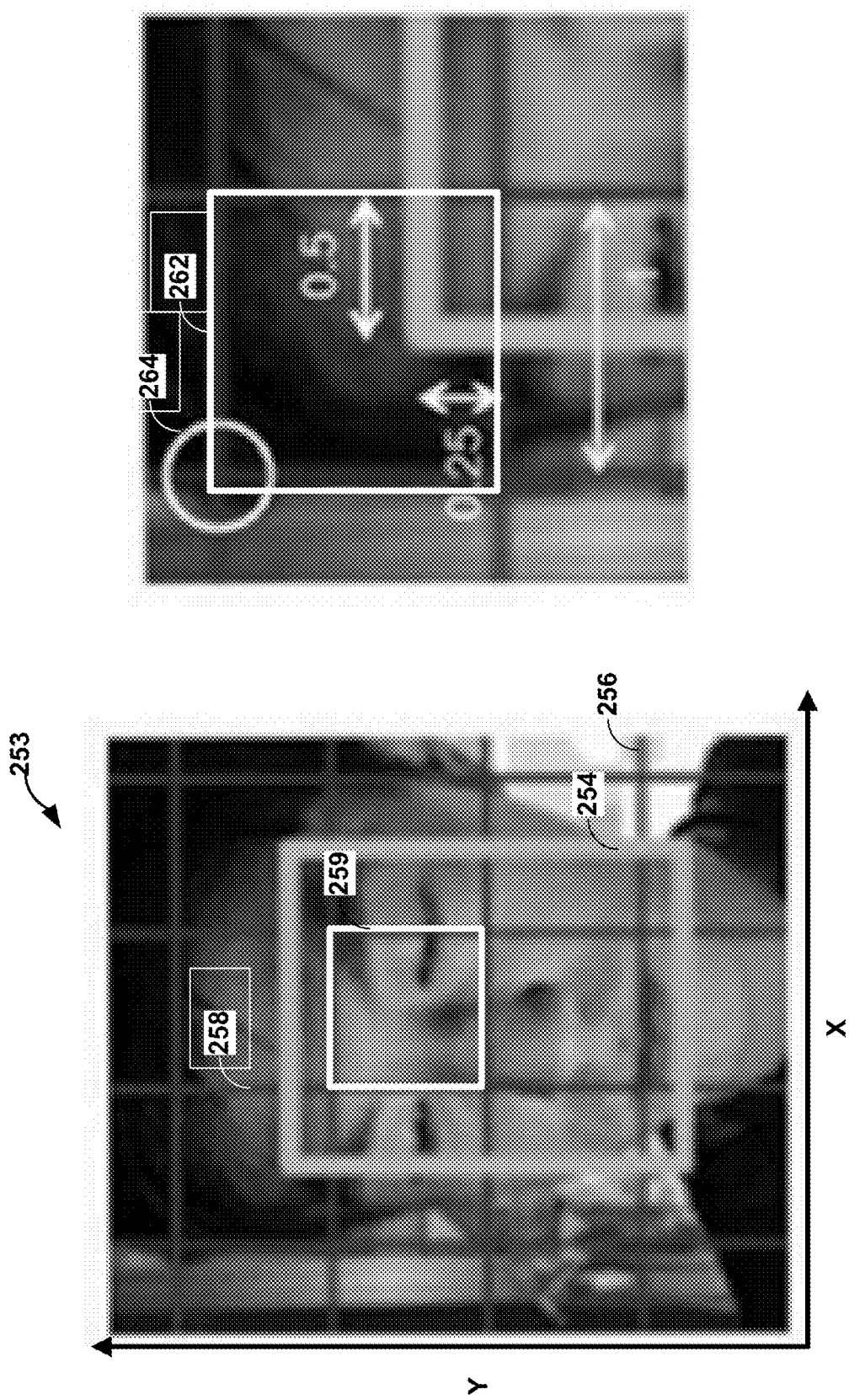
FIG. 10 is a conceptual diagram showing an example lens shading correction process.

FIG. 10 is a conceptual diagram showing an example lens shading correction (LSC) process. As shown in FIG. 10, a face ROI 254 of partial image 253 is divided into an LSC grid. The LSC grid includes a plurality of X direction gridlines 256 and a plurality of Y direction gridlines 258. The LSC process (e.g., lens shading correction 410 of FIG. 9) may apply an LSC grid gain to pixels within each grid region of the LSC grid. One example grid region is grid region 259, which is fully within face ROI 254. As shown in the blown-up image 260, grid region 262 may include pixels both within face ROI 254 and outside of face ROI 254, as indicated by corner 264 of grid region 262 being outside of face ROI 254. Grid region 262 may be referred to as a boundary grid.

The LSC grid gain is equal to an x-direction weight (WeightX) multiplied by a y-direction weight (WeightY) and a local adjust gain (LAG). For example, LSC grid gain=WeightX*WeightY*LAG. The local adjust gain is determined from the local AWB parameters. In the example of FIG. 9, the local adjust gain is sent by WB process 408. The LSC process determines WeightX and WeightY from the ratio of a particular LSC grid region relative to the ROI (e.g., face ROI 254). That is, WeightX and WeightY are determined based on how much a particular LSC grid region is within an ROI in the X and Y directions, respectively. In the example of FIG. 10, grid region 259 is completely within face ROI 254. As such, WeightX and WeightY are both 1. As such, the LSC process applies an LSC grid gain equal to the local adjust gain for all pixels within grid region 259.

For boundary grids, such as grid region 262, WeightX and WeightY are also determined based on the ratio of a particular LSC grid region relative to the ROI. As shown in blown-up image 260, grid region 262 has dimensions of 1 unit by 1 unit in the X and Y directions. In the X direction, 0.5 of grid region 262 is within face ROI 254. In the Y direction, 0.25 of grid region 262 is within face ROI 254. Therefore, the LSC process would determine that WeightX is 0.5 and WeightY is 0.25 for grid region 262. The LSC grid gain for grid region 262 would then be 0.5*0.25*LAG. A grid region completely outside face ROI would have weights equal to 0. Thus no LSC grid gain would be applied. By applying LSC grid gains in this manner, a smooth transition between pixels in the face ROI and pixels outside the face ROI can be achieved, even as the face ROI moves between frames.

Figure 11:
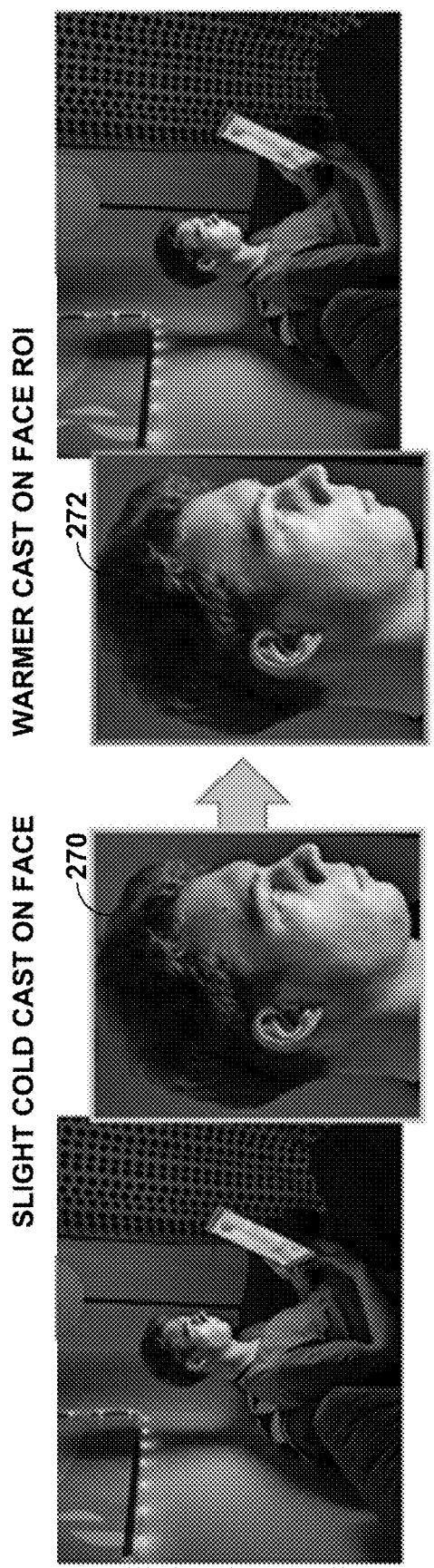
FIG. 11 is a conceptual diagram showing a first image produced with a global automatic white balance process and a second image produced with a combined global and face automatic white balance process.

FIG. 11 is a conceptual diagram showing a first image 270 produced with a global automatic white balance process in a mixed light scene and a second image 272 produced with a combined global and face automatic white balance process of the disclosure in a mixed light scene. Using only a global automatic white balance process, the first image may result in a slight cold case on the face, which may look unnatural and may be undesirable for some users. By applying the flexible local face color improvement of this disclosure, the face skin tone may be considered in mixed light scenes, which may result in less color cast. In addition, both the face skin tone and background white balance can be fine-tuned individually and flexibly. In the example of FIG. 11, the face ROI of second image 272 has a generally warmer cast on the face ROI compared to first image 270. The warmer cast may generally be more desirable as the warmer cast may better reflect the natural color of the face.

Figure 12:
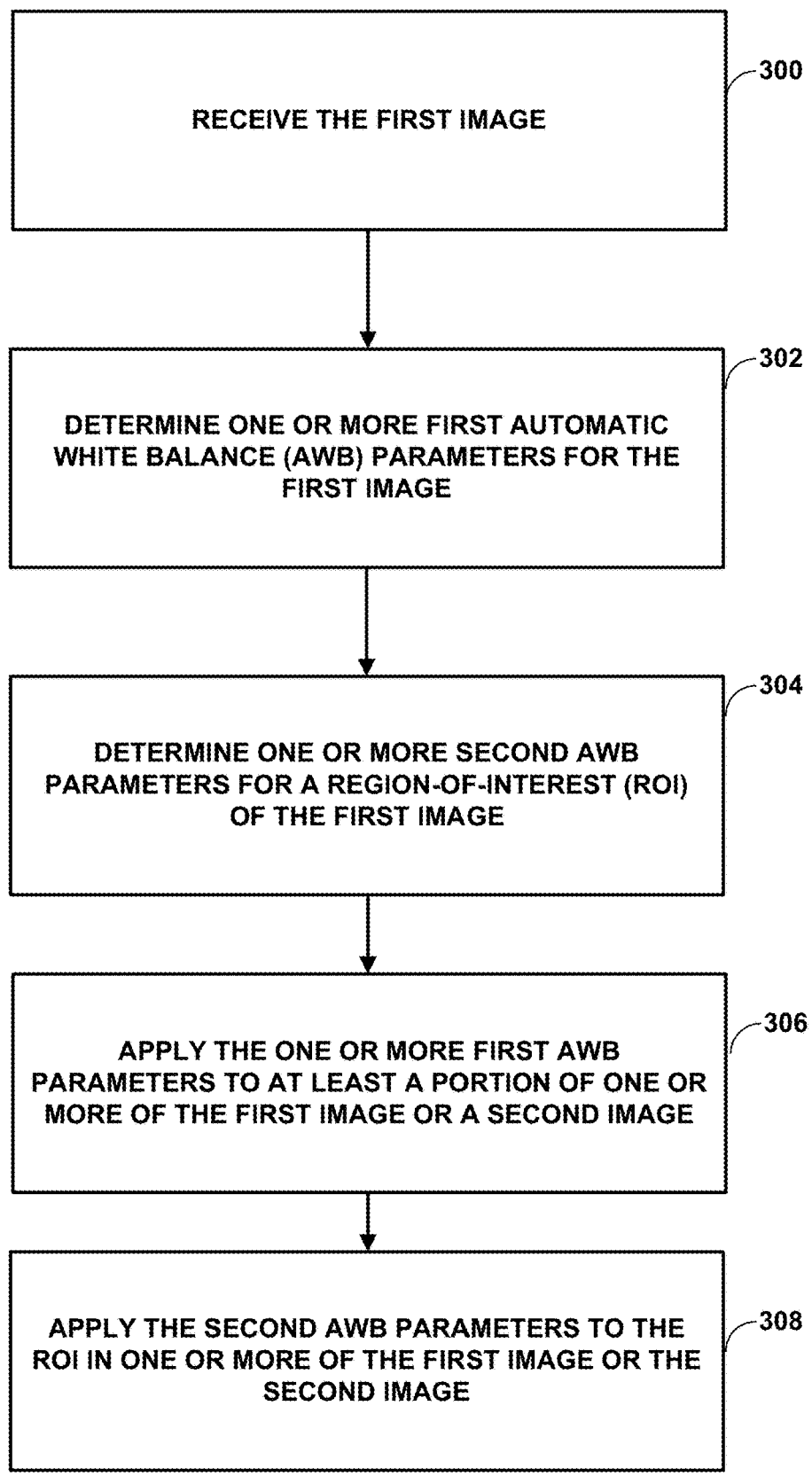
FIG. 12 is a flowchart illustrating an example method of the disclosure.

FIG. 12 is a flowchart illustrating an example method of the disclosure. The techniques of FIG. 12 may be performed by one or more processors, including image signal processor 6 of FIG. 1

In one example of the disclosure, image signal processor 6 may be configured to receive a first image (300), and determine one or more first (e.g., global) AWB parameters for the first image (302). Image signal processor 6 may be further configured to determine one or more second (e.g., local) AWB parameters for a region-of-interest (ROI) of the first image (304). Image signal processor 6 may apply the one or more global AWB parameters to one or more of the first image or a second image (e.g., a subsequently captured image) (306), and apply the second AWB parameters to the ROI in one or more of the first image or the second image based on the one or more local AWB parameters (308).

In one example, the ROI is a face of a person. In this example, image signal processor 6 may be further configured to detect a face. In other examples, image signal processor 6 may be further configured to detect an area of skin in the face. For example, image signal processor 6 may be configured to detect the area of skin in the face using one or more segmentation techniques, wherein the segmentation techniques include one or more of artificial intelligence-based skin detection or skin chroma filtering.

In another example, image signal processor 6 may be configured to adjust the area of skin in the face of one or more of the first image or the second image based on the one or more local AWB parameters. In another example, image signal processor 6 may be configured to adjust the ROI in one or more of the first image or the second image based on the one or more local AWB parameters using one or more of a grid white balance technique, a lens shading correction technique, or a pixel processing technique.

In examples of the disclosure, the one or more global AWB parameters or the one or more local AWB parameters include one or more of an AWB gain, a correlated color temperature (CCT), or a color correction matrix (CCM).

In another example, to determine the one or more local AWB parameters for the ROI of the first image, image signal processor 6 may be configured to determine the one or more local AWB parameters for the ROI of the first image based in part on the one or more global AWB parameters.

In another example, to determine the one or more global AWB parameters for the first image, image signal processor 6 may be configured to determine the one or more global AWB parameters for the first image using a gray-world technique.

Other illustrative aspects of the disclosure are described below.

Aspect 1—An apparatus configured for image processing, the apparatus comprising: a memory configured to store a first image captured by an image sensor of a camera module; and one or more processors in communication with the memory, the one or more processors configured to: receive the first image; determine one or more first automatic white balance (AWB) parameters for the first image; determine one or more second AWB parameters for a region-of-interest (ROI) of the first image; and apply the one or more first AWB parameters to at least a portion of one or more of the first image or a second image and apply the second AWB parameters to the ROI in one or more of the first image or the second image.

Aspect 1A—The apparatus of Aspect 1, wherein the one or more processors are further configured to: apply the one or more first AWB parameters to one or more of the first image or the second image; and adjust the ROI in one or more of the first image or the second image based on the one or more second AWB parameters.

Aspect 2—The apparatus of Aspect 1, wherein the ROI includes skin of a person.

Aspect 3—The apparatus of Aspect 2, wherein the one or more processors are further configured to: detect a face.

Aspect 4—The apparatus of Aspect 3, wherein the one or more processors are further configured to: detect an area of the skin in the face.

Aspect 5—The apparatus of Aspect 4, wherein to detect the area of the skin in the face, the one or more processors are configured to: detect the area of the skin in the face using one or more segmentation techniques, wherein the segmentation techniques include one or more of artificial intelligence skin detection or skin chroma filtering.

Aspect 6—The apparatus of Aspect 4, wherein to adjust the ROI in one or more of the first image or the second image based on the one or more second AWB parameters, the one or more processors are configured to: adjust the area of the skin in the face of one or more of the first image or the second image based on the one or more second AWB parameters.

Aspect 7—The apparatus of Aspect 1, wherein to adjust the ROI in one or more of the first image or the second image based on the one or more second AWB parameters, the one or more processors are further configured to: adjust the ROI in one or more of the first image or the second image based on the one or more second AWB parameters using one or more of a grid white balance technique, a lens shading correction technique, or a pixel processing technique.

Aspect 8—The apparatus of Aspect 1, wherein the one or more first AWB parameters or the one or more second AWB parameters include one or more of an AWB gain, a correlated color temperature (CCT), or a color correction matrix (CCM).

Aspect 9—The apparatus of Aspect 1, wherein to determine the one or more second AWB parameters for the ROI of the first image, the one or more processors are further configured to: determine the one or more second AWB parameters for the ROI of the first image based in part on the one or more first AWB parameters.

Aspect 9A—The apparatus of Aspect 1, wherein to determine the one or more second AWB parameters for the ROI of the first image, the one or more processors are further configured to: determine the one or more second AWB parameters for the ROI of the first image based only on pixel values in the ROI.

Aspect 10—The apparatus of Aspect 1, wherein to determine the one or more first AWB parameters for the first image, the one or more processors are further configured to: determine the one or more first AWB parameters for the first image using a gray-world technique.

Aspect 11—The apparatus of Aspect 1, further comprising: the camera module configured to capture the first image.

Aspect 12—The apparatus of Aspect 1, wherein the camera module is part of a mobile telephone.

Aspect 13—A method for image processing, the method comprising: receiving a first image; determining one or more first automatic white balance (AWB) parameters for the first image; determining one or more second AWB parameters for a region-of-interest (ROI) of the first image; and applying the one or more first AWB parameters to at least a portion of one or more of the first image or a second image and applying the second AWB parameters to the ROI in one or more of the first image or the second image.

Aspect 13A—The method of Aspect 13, further comprising: applying the one or more first AWB parameters to one or more of the first image or the second image; and adjusting the ROI in one or more of the first image or the second image based on the one or more second AWB parameters.

Aspect 14—The method of Aspect 13, wherein the ROI includes skin of a person.

Aspect 15—The method of Aspect 14, further comprising: detecting a face.

Aspect 16—The method of Aspect 15, further comprising: detecting an area of the skin in the face.

Aspect 17—The method of Aspect 16, wherein detecting the area of the skin in the face comprises: detecting the area of the skin in the face using one or more segmentation techniques, wherein the segmentation techniques include one or more of artificial intelligence skin detection or skin chroma filtering.

Aspect 18—The method of Aspect 16, wherein adjusting the ROI in one or more of the first image or the second image based on the one or more second AWB parameters comprises: adjusting the area of the skin in the face of one or more of the first image or the second image based on the one or more second AWB parameters.

Aspect 19—The method of Aspect 13, wherein adjusting the ROI in one or more of the first image or the second image based on the one or more second AWB parameters comprises: adjusting the ROI in one or more of the first image or the second image based on the one or more second AWB parameters using one or more of a grid white balance technique, a lens shading correction technique, or a pixel processing technique.

Aspect 20—The method of Aspect 13, wherein the one or more first AWB parameters or the one or more second AWB parameters include one or more of an AWB gain, a correlated color temperature (CCT), or a color correction matrix (CCM).

Aspect 21—The method of Aspect 13, wherein determining the one or more second AWB parameters for the ROI of the first image comprises: determining the one or more second AWB parameters for the ROI of the first image based in part on the one or more first AWB parameters.

Aspect 21A—The method of Aspect 13, wherein determining the one or more second AWB parameters for the ROI of the first image comprises: determining the one or more second AWB parameters for the ROI of the first image based only on pixel values in the ROI.

Aspect 22—The method of Aspect 13, wherein determining the one or more first AWB parameters for the first image comprises: determining the one or more first AWB parameters for the first image using a gray-world technique.

Aspect 23—An apparatus configured for camera processing, the apparatus comprising: means for performing the methods of Aspects 13-22.

Aspect 24—A non-transitory computer-readable storage medium storing instructions that, when executed, causes one or more processors to perform the methods of Aspects 13-22.

Aspect 25—An apparatus configured for image processing, the apparatus comprising: a memory configured to store a first image captured by an image sensor of a camera module; and one or more processors in communication with the memory, the one or more processors configured to: receive the first image; determine one or more first automatic white balance (AWB) parameters for the first image; determine one or more second AWB parameters for a region-of-interest (ROI) of the first image; and apply the one or more first AWB parameters to at least a portion of one or more of the first image or a second image and apply the second AWB parameters to the ROI in one or more of the first image or the second image.

Aspect 25A—The apparatus of Aspect 25, wherein the one or more processors are further configured to: apply the one or more first AWB parameters to one or more of the first image or the second image; and adjust the ROI in one or more of the first image or the second image based on the one or more second AWB parameters.

Aspect 26—The apparatus of Aspect 25, wherein the ROI includes skin of a person.

Aspect 27—The apparatus of Aspect 26, wherein the one or more processors are further configured to: detect a face.

Aspect 28—The apparatus of Aspect 27, wherein the one or more processors are further configured to: detect an area of the skin in the face.

Aspect 29—The apparatus of Aspect 28, wherein to detect the area of the skin in the face, the one or more processors are configured to: detect the area of the skin in the face using one or more segmentation techniques, wherein the segmentation techniques include one or more of artificial intelligence skin detection or skin chroma filtering.

Aspect 30—The apparatus of Aspect 28, wherein to adjust the ROI in one or more of the first image or the second image based on the one or more second AWB parameters, the one or more processors are configured to: adjust the area of the skin in the face of one or more of the first image or the second image based on the one or more second AWB parameters.

Aspect 31—The apparatus of any of Aspects 25-30, wherein to adjust the ROI in one or more of the first image or the second image based on the one or more second AWB parameters, the one or more processors are further configured to: adjust the ROI in one or more of the first image or the second image based on the one or more second AWB parameters using one or more of a grid white balance technique, a lens shading correction technique, or a pixel processing technique.

Aspect 32—The apparatus of any of Aspects 25-31, wherein the one or more first AWB parameters or the one or more second AWB parameters include one or more of an AWB gain, a correlated color temperature (CCT), or a color correction matrix (CCM).

Aspect 33—The apparatus of any of Aspects 25-32, wherein to determine the one or more second AWB parameters for the ROI of the first image, the one or more processors are further configured to: determine the one or more second AWB parameters for the ROI of the first image based in part on the one or more first AWB parameters.

Aspect 33A—The apparatus of any of Aspects 25-32, wherein to determine the one or more second AWB parameters for the ROI of the first image, the one or more processors are further configured to: determine the one or more second AWB parameters for the ROI of the first image based only on pixel values in the ROI.

Aspect 34—The apparatus of any of Aspects 25-33, wherein to determine the one or more first AWB parameters for the first image, the one or more processors are further configured to: determine the one or more first AWB parameters for the first image using a gray-world technique.

Aspect 35—The apparatus of any of Aspects 25-34, further comprising: the camera module configured to capture the first image.

Aspect 36—The apparatus of any of Aspects 25-35, wherein the camera module is part of a mobile telephone.

Aspect 37—A method for image processing, the method comprising: receiving a first image; determining one or more first automatic white balance (AWB) parameters for the first image; determining one or more second AWB parameters for a region-of-interest (ROI) of the first image; and applying the one or more first AWB parameters to at least a portion of one or more of the first image or a second image and applying the second AWB parameters to the ROI in one or more of the first image or the second image.

Aspect 37A—The method of Aspect 37, further comprising: applying the one or more first AWB parameters to one or more of the first image or the second image; and adjusting the ROI in one or more of the first image or the second image based on the one or more second AWB parameters.

Aspect 38—The method of Aspect 37, wherein the ROI includes skin of a person.

Aspect 39—The method of Aspect 38, further comprising: detecting a face.

Aspect 40—The method of Aspect 39, further comprising: detecting an area of the skin in the face.

Aspect 41—The method of Aspect 40, wherein detecting the area of the skin in the face comprises: detecting the area of the skin in the face using one or more segmentation techniques, wherein the segmentation techniques include one or more of artificial intelligence skin detection or skin chroma filtering.

Aspect 42—The method of Aspect 40, wherein adjusting the ROI in one or more of the first image or the second image based on the one or more second AWB parameters comprises: adjusting the area of the skin in the face of one or more of the first image or the second image based on the one or more second AWB parameters.

Aspect 43—The method of any of Aspects 37-42, wherein adjusting the ROI in one or more of the first image or the second image based on the one or more second AWB parameters comprises: adjusting the ROI in one or more of the first image or the second image based on the one or more second AWB parameters using one or more of a grid white balance technique, a lens shading correction technique, or a pixel processing technique.

Aspect 44—The method of any of Aspects 37-43, wherein the one or more first AWB parameters or the one or more second AWB parameters include one or more of an AWB gain, a correlated color temperature (CCT), or a color correction matrix (CCM).

Aspect 45—The method of any of Aspects 37-44, wherein determining the one or more second AWB parameters for the ROI of the first image comprises: determining the one or more second AWB parameters for the ROI of the first image based in part on the one or more first AWB parameters.

Aspect 45A—The method of any of Aspects 37-44, wherein determining the one or more second AWB parameters for the ROI of the first image comprises: determining the one or more second AWB parameters for the ROI of the first image based only on pixel values in the ROI.

Aspect 46—The method of any of Aspects 37-45, wherein determining the one or more first AWB parameters for the first image comprises: determining the one or more first AWB parameters for the first image using a gray-world technique.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:
1. An apparatus configured for image processing, the apparatus comprising:
  a memory configured to store a first image captured by an image sensor of a camera module; and
  one or more processors in communication with the memory, the one or more processors configured to:
    receive the first image;
    determine one or more first automatic white balance (AWB) parameters for the first image;
    determine one or more second AWB parameters for a region-of-interest (ROI) of the first image;
    apply the one or more first AWB parameters to at least a portion of one or more of the first image or a second image;
    divide the ROI into a grid including a plurality of rectangular regions; and
    apply a lens shading correction grid gain to pixels in each respective rectangular region of the plurality of rectangular regions in the grid, wherein the lens shading correction grid gain is based on the second AWB parameters, wherein to apply the lens shading correction grid gain, the one or more processors are configured to:
      determine a local adjustment gain (LAG) from the second AWB Parameters;
      determine a respective x-direction weight (WeightX) for each respective rectangular region of the plurality of rectangular regions;
      determine a respective y-direction weight (WeightY) for each respective rectangular region of the plurality of rectangular regions; and
      apply the lens shading correction grid gain in each respective rectangular region of the plurality of rectangular regions in the grid as a function of WeightX*WeightY*LAG.

2. The apparatus of claim 1, wherein the one or more processors are further configured to:
 apply the one or more first AWB parameters to one or more of the first image or the second image; and
 adjust the ROI in one or more of the first image or the second image based on the one or more second AWB parameters.

3. The apparatus of claim 2, wherein the ROI includes skin of a person.

4. The apparatus of claim 3, wherein the one or more processors are further configured to detect a face.

5. The apparatus of claim 4, wherein the one or more processors are further configured to detect an area of the skin in the face.

6. The apparatus of claim 5, wherein to detect the area of the skin in the face, the one or more processors are configured to detect the area of the skin in the face using one or more segmentation techniques, wherein the one or more segmentation techniques include one or more of artificial intelligence-based skin detection or skin chroma filtering.

7. The apparatus of claim 5, wherein to adjust the ROI in one or more of the first image or the second image based on the one or more second AWB parameters, the one or more processors are configured to adjust the area of the skin in the face of one or more of the first image or the second image based on the one or more second AWB parameters.

8. The apparatus of claim 1, wherein the one or more first AWB parameters or the one or more second AWB parameters include one or more of an AWB gain, a correlated color temperature (CCT), or a color correction matrix (CCM).

9. The apparatus of claim 1, wherein to determine the one or more second AWB parameters for the ROI of the first image, the one or more processors are further configured to determine the one or more second AWB parameters for the ROI of the first image based in part on the one or more first AWB parameters.

10. The apparatus of claim 1, wherein to determine the one or more second AWB parameters for the ROI of the first image, the one or more processors are further configured to determine the one or more second AWB parameters for the ROI of the first image based only on pixel values in the ROI.

11. The apparatus of claim 1, wherein to determine the one or more first AWB parameters for the first image, the one or more processors are further configured to determine the one or more first AWB parameters for the first image using a gray-world technique.

12. The apparatus of claim 1, further comprising the camera module configured to capture the first image.

13. The apparatus of claim 1, wherein the camera module is part of a mobile telephone.

14. The apparatus of claim 1, wherein the one or more processors are configured to:
 determine the respective x-direction weight (WeightX) based on a first ratio of an x-dimension of the respective rectangular region relative to the ROI; and
 determine the respective y-direction weight (WeightY) based on a second ratio of a y-dimension of the respective rectangular region relative to the ROI.

15. A method for image processing, the method comprising:
 receiving a first image;
 determining one or more first automatic white balance (AWB) parameters for the first image;
 determining one or more second AWB parameters for a region-of-interest (ROI) of the first image;
 applying the one or more first AWB parameters to at least a portion of one or more of the first image or a second image;
 dividing the ROI into a grid including a plurality of rectangular regions; and
 applying a lens shading correction grid gain to pixels in each respective rectangular region of the plurality of rectangular regions in the grid, wherein the lens shading correction grid gain is based on the second AWB parameters, wherein applying the lens shading correction grid gain comprises:
 determining a local adjustment gain (LAG) from the second AWB parameters;
 determining a respective x-direction weight (WeightX) for each respective rectangular region of the plurality of rectangular regions;
 determining a respective y-direction weight (WeightY) for each respective rectangular region of the plurality of rectangular regions; and
 applying the lens shading correction grid gain in each respective rectangular region of the plurality of rectangular regions in the grid as a function of WeightX*WeightY*LAG.

16. The method of claim 15, further comprising:
 applying the one or more first AWB parameters to one or more of the first image or the second image; and
 adjusting the ROI in one or more of the first image or the second image based on the one or more second AWB parameters.

17. The method of claim 16, wherein the ROI includes skin of a person.

18. The method of claim 17, further comprising detecting a face.

19. The method of claim 18, further comprising detecting an area of the skin in the face.

20. The method of claim 19, wherein detecting the area of the skin in the face comprises detecting the area of the skin in the face using one or more segmentation techniques, wherein the one or more segmentation techniques include one or more of artificial intelligence-based skin detection or skin chroma filtering.

21. The method of claim 19, wherein adjusting the ROI in one or more of the first image or the second image based on the one or more second AWB parameters comprises adjusting the area of the skin in the face of one or more of the first image or the second image based on the one or more second AWB parameters.

22. The method of claim 15, wherein the one or more first AWB parameters or the one or more second AWB parameters include one or more of an AWB gain, a correlated color temperature (CCT), or a color correction matrix (CCM).

23. The method of claim 15, wherein determining the one or more second AWB parameters for the ROI of the first image comprises determining the one or more second AWB parameters for the ROI of the first image based in part on the one or more first AWB parameters.

24. The method of claim 15, wherein determining the one or more second AWB parameters for the ROI of the first image comprises determining the one or more second AWB parameters for the ROI of the first image based only on pixel values in the ROI.

25. The method of claim 15, wherein determining the one or more first AWB parameters for the first image comprises determining the one or more first AWB parameters for the first image using a gray-world technique.

26. The method of claim 15, further comprising:
- determining the respective x-direction weight (WeightX) based on a first ratio of an x-dimension of the respective rectangular region relative to the ROI; and
- determining the respective y-direction weight (WeightY) based on a second ratio of a y-dimension of the respective rectangular region relative to the ROI.

27. A non-transitory computer-readable storage medium storing instructions that, when executed, causes one or more processors to:
- receive a first image;
- determine one or more first automatic white balance (AWB) parameters for the first image;
- determine one or more second AWB parameters for a region-of-interest (ROI) of the first image;
- apply the one or more first AWB parameters to at least a portion of one or more of the first image or a second image;
- divide the ROI into a grid including a plurality of rectangular regions; and
- apply a lens shading correction grid gain to pixels in each respective rectangular region of the plurality of rectangular regions in the grid, wherein the lens shading correction grid gain is based on the second AWB parameters, wherein to apply the lens shading correction grid gain, the instructions further cause the one or more processors to:
  - determine a local adjustment gain (LAG) from the second AWB parameters;
  - determine a respective x-direction weight (WeightX) for each respective rectangular region of the plurality of rectangular regions;
  - determine a respective y-direction weight (WeightY) for each respective rectangular region of the plurality of rectangular regions; and
  - apply the lens shading correction grid gain in each respective rectangular region of the plurality of rectangular regions in the grid as a function of WeightX*WeightY*LAG.

28. The non-transitory computer-readable storage medium of claim 27, wherein instructions further cause the one or more processors to:
- apply the one or more first AWB parameters to one or more of the first image or the second image; and
- adjust the ROI in one or more of the first image or the second image based on the one or more second AWB parameters.

29. The non-transitory computer-readable storage medium of claim 28, wherein the ROI includes skin of a person.

30. The non-transitory computer-readable storage medium of claim 29, wherein the instructions further cause the one or more processors to detect a face.

31. The non-transitory computer-readable storage medium of claim 30, wherein the instructions further cause the one or more processors to detect an area of the skin in the face.

32. The non-transitory computer-readable storage medium of claim 31, wherein to detect the area of the skin in the face, the instructions further cause the one or more processors to detect the area of the skin in the face using one or more segmentation techniques, wherein the one or more segmentation techniques include one or more of artificial intelligence-based skin detection or skin chroma filtering.

33. The non-transitory computer-readable storage medium of claim 31, wherein to adjust the ROI in one or more of the first image or the second image based on the one or more second AWB parameters, the instructions further cause the one or more processors to adjust the area of the skin in the face of one or more of the first image or the second image based on the one or more second AWB parameters.

34. The non-transitory computer-readable storage medium of claim 27, wherein the one or more first AWB parameters or the one or more second AWB parameters include one or more of an AWB gain, a correlated color temperature (CCT), or a color correction matrix (CCM).

35. The non-transitory computer-readable storage medium of claim 27, wherein to determine the one or more second AWB parameters for the ROI of the first image, the instructions further cause the one or more processors to determine the one or more second AWB parameters for the ROI of the first image based in part on the one or more first AWB parameters.

36. The non-transitory computer-readable storage medium of claim 27, wherein to determine the one or more second AWB parameters for the ROI of the first image, the instructions further cause the one or more processors to determine the one or more second AWB parameters for the ROI of the first image based only on pixel values in the ROI.

37. The non-transitory computer-readable storage medium of claim 27, wherein to determine the one or more first AWB parameters for the first image, the instructions further cause the one or more processors to determine the one or more first AWB parameters for the first image using a gray-world technique.

38. The -transitory computer-readable storage medium of claim 27, wherein the instructions further cause the one or more processors to:
- determine the respective x-direction weight (WeightX) based on a first ratio of an x-dimension of the respective rectangular region relative to the ROI; and
- determine the respective y-direction weight (WeightY) based on a second ratio of a y-dimension of the respective rectangular region relative to the ROI.

* * * * *